United States Patent
Hausman

(10) Patent No.: US 7,822,672 B2
(45) Date of Patent: Oct. 26, 2010

(54) PRICE CHANGE OF ORDERS FROM RESERVE IN AN ELECTRONIC TRADING SYSTEM

(75) Inventor: Andrew Hausman, Summit, NJ (US)

(73) Assignee: Bloomberg L.P., New York, NY (US)

( * ) Notice: Subject to any disclaimer, the term of this patent is extended or adjusted under 35 U.S.C. 154(b) by 1445 days.

(21) Appl. No.: 09/839,529

(22) Filed: Apr. 20, 2001

(65) Prior Publication Data

US 2002/0178104 A1 Nov. 28, 2002

(51) Int. Cl.
*G06Q 40/00* (2006.01)
(52) U.S. Cl. ............................................... 705/37
(58) Field of Classification Search .................. 705/35, 705/36 R, 37
See application file for complete search history.

(56) References Cited

U.S. PATENT DOCUMENTS 4,674,044 A * 6/1987 Kalmus et al. ............... 705/37

(Continued)

FOREIGN PATENT DOCUMENTS

| EP | 1589 450 A1 | 10/2005 |
|---|---|---|
| WO | WO 01/16830 | 3/2001 |

OTHER PUBLICATIONS

Austrailian Patent Office Search Report and examination report in counterpart application to U.S. Appl. No. 11/263,622, 12 pgs., Aug. 19, 2009.

(Continued)

*Primary Examiner*—Ojo O Oyebisi
(74) *Attorney, Agent, or Firm*—Frank J. DeRosa, Esq.; Frommer Lawrence & Haug LLP

(57) ABSTRACT

Electronic trading of interests using reserves and a price change feature. A portion of a total desired trade quantity may be held in reserve, and thereby not disclosed in the relevant market. The invention provides for a subsequent trade order or quotation to be automatically initiated from the reserve when the disclosed order is accepted. The price of the subsequent order of a given reserve quantity will be different from the prior disclosed price. The process for disclosing a subsequent order may be fully or partially automatic, e.g., with or without a requirement for a response to a prompt by the trader entering the order. Preferably, the cycle of new orders with changed prices continues until the reserve is exhausted. The invention is useful for trading, for example, current or future interests in equities, fixed-income securities, currencies, and commodities such as foods, resources, energy, and emissions rights, and other interests.

39 Claims, 16 Drawing Sheets

U.S. PATENT DOCUMENTS

| | | | |
|---|---|---|---|
| 4,903,201 A | 2/1990 | Wagner | |
| 5,101,353 A * | 3/1992 | Lupien et al. | 705/37 |
| 5,136,501 A | 8/1992 | Silverman et al. | |
| 5,905,975 A | 5/1999 | Ausubel | 705/37 |
| 6,061,691 A | 5/2000 | Fox | 707/104 |
| 6,243,691 B1 | 6/2001 | Fisher et al. | |
| 6,321,212 B1 | 11/2001 | Lange | |
| 6,442,258 B1 | 8/2002 | Mashinsky | |
| 6,546,375 B1 | 4/2003 | Pang et al. | |
| 2002/0082967 A1 | 6/2002 | Kaminsky et al. | |
| 2002/0178104 A1 | 11/2002 | Hausman | |
| 2002/0184136 A1 | 12/2002 | Cleary Neubert et al. | |
| 2003/0033235 A1 | 2/2003 | Hummelgren | |
| 2003/0093343 A1 | 5/2003 | Huttenlocher et al. | |
| 2004/0059666 A1 * | 3/2004 | Waelbroeck et al. | 705/37 |
| 2004/0143538 A1 | 7/2004 | Korhammer et al. | |
| 2004/0236662 A1 | 11/2004 | Korhammer et al. | |
| 2006/0136318 A1 | 6/2006 | Rafieyan et al. | |
| 2006/0218071 A1 | 9/2006 | Sweeting | |
| 2009/0192933 A1 | 7/2009 | Singer et al. | |

OTHER PUBLICATIONS

International Preliminary Examination Report in counterpart PCT application No. PCT/US02/11200, 3 pgs.

Examination Report in counterpart British Application No. GB 0324271.6, 6 pgs, 2005.

* cited by examiner

P-V01MAY ↑304.00 +4.00 270.00/305.00 Comdty EMON

At 13:36 Vol 25 Op 304.00 Hi 304.00 Lo 304.00 OpInt n.a.
PALO / COB / MID COLUMBIA

Add new BID

| Palo Verde | May 2001 |

Delivery: Physical power, Into Palo Verde
Type    : Financ. firm, w/liquidated damages, WSPP schedule C-2
Days    : 26 (Monday-Saturday, excluding NERC holidays 6X16)
Dates   : 5/01/2001 through 5/31/2001
Hours   : HE 0700 - HE 2200, Pacific Prevailing Time

Price,   Size,   Reserve
USD/MW       MW          Size  Scaleback
100.00       25          75    1.000

© Copyright 2001, Bloomberg LP

FIG. 6

GRAB
Screen saved as C:\blp\data\tkts3.bmp              Comdty EMON
NP15 / SP15

Modify BID

| CAL ISO NP15 | Q4 | 2001 | | Seq# | 10 |

Delivery: Physical power, CAL ISO NP15
Type    : Financ. firm, w/liquidated damages, CAISO firm energy
Days    : 77 (Monday-Saturday, excluding NERC holidays 6X16)
Dates   : 10/01/2001 through 12/31/2001
Hours   : HE 0700 - HE 2200, Pacific Prevailing Time

Price,      Size,           Reserve
USD/MW          MW                  Size Scaleback
[100.00]        [25]                [75]   [1.000]

© Copyright 2001, Bloomberg LP

GRAB
99<GO> Menu of Options
NP15 / SP15     POWERMATCH ORDERS                        Comdty EORD Page 1/ 1

| Term | | | Price | Size | B/S | Placed By | Seq# | Status |
|---|---|---|---|---|---|---|---|---|
| 1) CAL ISO NP15 | Q4 | 2001 | 100.00 | 25 | B | 1 133687 | 11 | Open |
| 2) CAL ISO SP15 | Cal | 2001 | 110.00 | 125 | B | 1 133687 | 9 | Open |
| 3) CAL ISO NP15 | Jun | 2001 | 335.00 | 25 | S | 1 133687 | 8 | Open |
| 4) CAL ISO SP15 | Jun | 2001 | 225.00 | 75 | B | 1 133687 | 7 | Open |
| 5) CAL ISO NP15 | Aug | 2001 | 275.00 | 50 | S | 1 133687 | 6 | Open |
| 6) CAL ISO SP15 | Aug | 2001 | 400.00 | 25 | S | 6 104850 | 5 | Open |
| 7) CAL ISO NP15 | Q3 | 2001 | 250.00 | 25 | S | 22 138117 | 4 | Open |
| 8) CAL ISO NP15 | Q3 | 2001 | 205.00 | 25 | B | 23 75376 | 3 | Open |
| 9) CAL ISO SP15 | Jun | 2001 | 200.00 | 25 | B | 9 41894 | 2 | Open |
| 10) CAL ISO SP15 | Tst | 2001 | 10.00 | 25 | B | 19 77078 | 1 | Filled |
| 11) CAL ISO NP15 | Q4 | 2001 | 100.00 | 25 | B | 1 133687 | 10 | Cancel |

© Copyright 2001, Bloomberg LP

FIG. 10

P-V01MAY 304.00 00Y as of close 3/29     Comdty EMON
Vol 25y 0pInt n.a.
PALO / COB / MID COLUMBIA

Modify BID

| Palo Verde | May 2001 | Seq# 2 |
|---|---|---|

Delivery: Physical power, Into Palo Verde
Type    : Financ. firm, w/liquidated damages, WSPP schedule C-2
Days    : 26 (Monday-Saturday, excluding NERC holidays 6X16)
Dates   : 5/01/2001 through 5/31/2001
Hours   : HE 0700 - HE 2200, Pacific Prevailing Time

Price,   Size,      Reserve
USD/MW       MW             Size   Scaleback
[ 50.00 ]   [ 25 ]         [ 25 ]  [ 1.000 ]

© Copyright 2001, Bloomberg LP

| P-V01MAY 304.00 00Y as of close 3/29 DG04 Comdty EMON |||||
|---|---|---|---|---|
| Vol 25y OpInt n.a. | | | | Page 1/3 |
| 93<GO> SUSPEND | 98<GO> CANCEL | | 99<GO> CANCEL FIRM'S 96<GO> YES 97<GO> NO |
| PALO / COB / MID COLUMBIA at 49.00 |||||
| SELL 75 MW | | | /MW | |
| Trades | Bid | Offer | Forward | <--> TRADER D'S ORDERS <--> |
|  | 25 50.00/ | | May 01 | <--> |
|  | 25 49.00/ | | | |
|  | 25 48.00/ | | Jun 01 | |
|  |  |  | Jul 01 | |
|  |  |  | Aug 01 | |
|  |  |  | Q3 01 | |
|  |  |  | Q4 02 | |
|  |  |  | Cal 02 | |
|  |  | → MID-C → | Cal 03 | → MID-C → |
|  |  |  | May 01 | |
|  |  |  | Jun 01 | |
|  |  |  | Jul 01 | |
|  |  |  | Aug 01 | |
|  |  |  | Q3 01 | |

© Copyright 2001, Bloomberg LP    * - Orders entered by my firm

PRICE CHANGE OF ORDERS FROM RESERVE IN AN ELECTRONIC TRADING SYSTEM

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

The invention disclosed herein relates generally to electronic trading of interests involving reserves. More particularly, the invention relates to pricing of orders and quotations (e.g., bids and offers) in an electronic trading or quotation system with reserves where the order or quotation price of a reserve quantity is changed, e.g., stepped up or down, from a prior order.

A trader of interests such as stocks, bonds, commodities or commodities contracts may want to buy or sell such interests without immediately revealing in the relevant market the full extent of his or her intentions. For example, the disclosure to the market of the entire size of a purchase or sale order or quotation could affect the market by skewing the price. In such instances, traders may want to disclose only a portion of the full size of their intended trade to the market, and to withhold disclosing to the market the remaining portion of the intended trade (such withheld portion being known as a "reserve") until such time as the disclosed portion of the order or quotation has been executed.

SUMMARY OF THE INVENTION

The invention provides a price change feature in electronic trading over a network or networks of many types of interests involving reserves. In accordance with the invention, an order or quotation involving a reserve quantity in an electronic trading or quotation system has a price that is changed, e.g., increased or decreased, from a prior order or quotations. The order or quotation price for the reserve quantity is changed fully or partially automatically from the price of a prior order or quotation. The quantity taken from reserve for the new order or quotation may be selected or set by the trader or by the system. The invention thereby assists traders in rapidly and efficiently completing trades involving reserves, and/or at better prices than might otherwise be obtained.

As mentioned, the invention is applicable to trading in many types of interests, including financial interests. For example, the invention is suitable for use in trading: equity interests such as stocks; fixed-income securities such as bonds, mortgages, short term notes, commercial paper, and other debt instruments; currencies; and commodities, such as foods, resources, energy, and emissions rights. It is also suitable for use with present interests as well as future or contingent interests such as options and forwards contracts.

For ease of description, the term "order" as used herein encompasses a "quotation" unless indicated otherwise or the context indicates otherwise. The terms "orders" or "trades" may apply to both bids and offers, and the invention applies to both bids and offers and sales and purchases. A trade may encompass a buy or sell transaction in which an interest is transferred. An order may be an indication of interest in trading in a specified interest. Orders can be binding upon acceptance by another trader. A disclosed order or proposed trade, or portion thereof, is also sometimes known, in various industries, and particular in various financial industries, as a "quotation." For ease of description, the term "electronic trading" encompasses "electronic quotation" unless indicated otherwise or the context indicated otherwise. Also, the terms "user" and "trader" may each encompass the other, as well as system administrators, etc.

The price of one or more orders from a reserve quantity may be increased or decreased by an amount that is set or selected by the trader, or by a system default or otherwise by the system. (Price changes for reserve quantities from a prior order are conveniently referred to herein as price steps, and the terms "price change" and "price step" are used interchangeably herein unless indicated otherwise or the context indicates otherwise.) Upon acceptance of an order—that is, at, during or after acceptance of an order, e.g., after initial acceptance of a disclosed order having a reserve, or at a point in the acceptance or execution process—another order is provided or defined and disclosed for all or a part of the reserve quantity at a price equal to the price of a prior order, preferably the most recent order, changed by the set, selected or default amount. The quantity taken from reserve may be set or selected by the trader, or by a system default or otherwise by the system. Preferably, the invention provides a cycle or series of orders from reserve, each having a quantity and price determined as indicated above, until the reserve is exhausted.

Preferably acceptance of a disclosed portion of an order is the event which triggers definition and disclosure of one or more subsequent portions of the order taken from the reserve. "Upon acceptance" of an order means at, during, or after receipt of an indication from a trader that the trader wishes or intends to accept the order, or at any point in the acceptance or execution process.

In a system incorporating reserve and the invention, a portion of the full quantity of an order may be displayed or otherwise disclosed, and a portion held in reserve, and another order involving a reserve quantity at a price different form the price of a previously displayed order may be disclosed later. If a displayed order (displayed quantity and price) is accepted, the system can provide (with or without intervention by the trader (or other appropriate user) once the price change feature is enabled or selected and a reserve price step has been associated with the order) for the display of an order with a reserve quantity at a price different from the previously displayed price. For example, the reserve quantity can be the same as the previously displayed quantity and the price can be stepped from the previously displayed price. In one embodiment, the invention provides the option of changing or not changing the price of the reserve quantity order, i.e., trader intervention is required before a new order from reserve will be price stopped. In another embodiment, the invention provides the option of selection by a user or trader of the change in price, or the system implementing a previously set or selected change in price, i.e., the order from reserve is automatically provided with a price step change. These provide for replenishing an order from reserve at a new or the same price, fully automatically or partially automatically (e.g., in response to a prompt).

The invention provides a method for electronic (e.g., computer) trading of interests using reserves over a network or networks and the price change feature described herein. The method comprises, upon acceptance of a previous proposed trade of interests at a previous price, disclosing terms of a subsequent proposed trade of such interests to other traders via a computer network. Terms for the subsequent proposed trade comprise an identification of the interests, a subsequent price, and a subsequent quantity, the subsequent price being equal to the previous price stepped by a reserve price step, and the subsequent quantity comprising at least a portion of the reserve quantity established by the trader.

In a preferred embodiment, the method comprises receiving, e.g., from a first trader, terms for a total desired trade of interests; associating with such desired trade a reserve price change; disclosing terms of a first proposed trade of the interest to others via a network; and, upon acceptance of the first proposed trade, disclosing terms of a second or subsequent proposed trade of the financial interest to others, who may be the same as, partially the same as, or different from the persons or organizations to whom the first proposed trade was disclosed. Terms of the second trade include a second price equal to the initial price plus or minus the price change. For example, the price of the second trade is changed or stepped by the reserve price change.

An embodiment of such a method implemented via an electronic trading system over a network or networks may comprise receiving from a trader terms for a total order to be entered on the system, and receiving from the trader information indicating what part of the order is initially displayed, what part held in reserve, and the terms of a subsequent order from reserve that will be displayed at a given point in the acceptance or execution process of the initially displayed order. Terms of the subsequent order may include a new price, set as described herein, and either the same or a changed quantity form the original quantity.

Terms used in disclosing and describing orders, which are typically supplied by the user entering the order, may include an identification of the interest(s) to be traded, initial price and quantity, reserve quantity, and prices (or price steps) and quantities for subsequent orders dealing in the reserve or replenished from the reserve. Interest identifiers may comprise any suitable terms or symbols, including, for example, the name of the interest or of the entity supplying the interest, an abbreviated name such as a stock symbol or ticker name, or other symbols or terms set by custom or regulation. Prices may be stated in any suitable or customary currency, such as for example United States dollars, Japanese yen, or German marks, and may be set on incremental scales. For example, until recently stocks were traded in the United States with prices set in increments of /1;16th of a dollar; thus such increments, where still used, are convenient for use in stating prices in practicing the invention.

The quantity of an order or reserve can be expressed in numbers of convenient or mandated units of whatever interest is traded. For example, quantity may be expressed in gallons or barrels of oil, numbers of shares of stock, or numbers of shares blocks of stock certificates, numbers of dollars, yen, or other currency units, and face value or arbitrary increments of bond value. As another example, quantities for electrical contracts are often discussed or displayed in terms of megawatts over a given period of time, such as for example hours, days, months, or quarters. In some industries, and in particular the energy trading industry, the term "volume" is used in place of, or interchangeably with, "quantity." The terms are synonymous for purposes of this specification, except where indicated otherwise or context indicates otherwise.

Prices are generally stated in terms of currency, and price changes are expressed in numbers most often representing the same currency as that used to express the initial order price. Preferably, association of a reserve price change with a trade order is made when an order with reserve is entered, the association being made either by the system alone or by the user and the system. For example, the price change may be set or selected by the trader, or set as a default (preferably overridable) by the trading system. Price changes of reserve quantity orders may be subject to customary or regulatory increment or decrement requirements. Price changes may be positive or negative—that is, they may be expressed as increments or decrements—for orders entered for a sale or a purchase (i.e., an "offer" or a "bid", or a bid or offer quotation). Zero price change may also be used to trade without changing the reserve price. In some circumstances, such as will be understood by those familiar with trading in financial and commodity markets, it is advantageous to change the price of subsequent portions of an order in such manner as to encourage the market to keep moving in a specific direction. For example, it may be advantageous to change the price of a replenished bid up, so that traders having interests to sell will be increasingly likely to accept the bid and thus improve chances of completing the desired size of the transaction. Likewise, it may be advantageous to change the price of a replenished offer down. However, it can also be advantageous, in other circumstances, to change prices in the opposite direction—down for bids and up for offers. For example, this tactic can be useful in testing the depth of the market.

The size of reserve price steps may vary from order to order and from replenishment cycle to replenishment cycle. That is, the step between an initial and second order need not be the same as the step between the second and third, or any subsequent, orders.

Preferably, stepping of the reserve price and disclosure to others of second and subsequent proposed trades for portions of the reserve quantity are accomplished automatically, as for example by a computer, at or after the acceptances of an order, e.g., upon receipt of an indication of acceptance of a previously-disclosed order.

Acceptance of an order may comprise either automatic or non-automatic indication of an intent to accept a proposed trade. For example, a trader may accept an order by sending an electronic indication to a computer system of his/her intent to accept the order. Or, for example, orders stating mutually acceptable terms (e.g., an order to buy and an order to sell similar quantities of the same interest at acceptably similar or identical prices) may be automatically matched and designated as accepted by a system which has received both orders.

As discussed above, stepping of the price for a subsequent reserve portion of an order and disclosure of the subsequent order may be automatically implemented, or only partially automatically implemented, for example, requiring action such as a confirmation by the trader who posted the proposed trade or other intervention by an appropriate system user. For example, in a computer-implemented embodiment of the invention the trader may be prompted, upon acceptance of his or her initial (or previous) order by another trader, to confirm that he or she wishes to display a new order taken from the reserve quantity and using a stepped price. In such embodiments, the system may provide for the trader to either confirm that he/she wishes to continue, modify terms of the subsequent order, or cancel the stepping and redisplaying process, whereupon remaining portions of the order may be held for later posting or cancelled. Other appropriate system users may include, for example, a system administrator or an administrator or supervisor from the trader's firm, who might be required to confirm entry of the order or continuing automatic replenishment and disclosure of orders from reserve.

In preferred embodiments of the invention, the cycle of stepping the order or price and disclosing a subsequent portion of a desired trade involving a new portion of the reserve is repeated until the reserve is exhausted, unless stopped or cancelled by the trader or other appropriate system user. Thus a trade can proceed from initial offering to second, third, fourth, and additional offerings, until there is no more reserve to trade. In such cases, the quantity offered from reserve from one cycle to the next may be selected by the trader entering the order, or set by the system automatically. Optionally, a default is offered by the system but may be overridden by the trader. For example, in some preferred embodiments quantity offered from the reserve quantity increment is equal to the original displayed order size. With each new order cycle, the quantity offered from the reserve is equal to the initial displayed order quantity, until the reserve is exhausted. The final order quantity from reserve may be less than the initial displayed order quantity, where insufficient quantity remains in the reserve. The quantity offered from reserve may vary from order to order and cycle to cycle, so that a second and third offering, for example, may be of unequal quantity.

Disclosure to and acceptance of initial, second, and any subsequent orders may be to or by the same or different traders.

The trading of interests using stepped-price reserves according to the invention is compatible with many other trading techniques. For example, one such technique is the "SWEEP" technique described herein and in application Ser. No. 60/152,017 and Ser. No. 09/584,045, which are discussed below. This technique is available in the BLOOMBERG POWERMATCH® system and other Bloomberg systems which can be accessed through the BLOOMBERG PROFESSIONAL™ service. Electronic trading incorporating the invention is also compatible with a wide variety of previously established trading methods and techniques, and with many more yet to be developed.

The invention also provides computer program products for implementing the inventive methods and processes described herein. Such computer program products comprise computer-usable media having computer-readable codes embodied therein that cause a computer to effect methods and processes incorporating the invention, as described herein.

The invention further provides computers or data processing systems for trading interests using reserves and price changes as described herein, such systems comprising circuitry configured for implementing methods and processes according to the invention.

For purposes of this disclosure, the terms "computer" and "data processor" are equivalent, and encompass automatic computation and data processing devices, especially digital and analog electronic and electromagnetic devices.

The order in which steps are described in association with processes or methods in this specification may not be significant; nor are all steps described necessarily essential part of the invention.

BRIEF DESCRIPTION OF THE DRAWINGS

The invention is illustrated in the Figures of the accompanying drawings which are meant to be exemplary and not limiting, and in which like references are intended to refer to like or corresponding parts.

FIGS. 5-16 are schematic diagrams of representative user interface screen displays from computer-implemented preferred embodiments of the invention.

DETAILED DESCRIPTION OF THE PREFERRED EMBODIMENTS

Preferred embodiments of methods, systems, and apparatus according to the invention are described through reference to the Figures.

Figure 1:
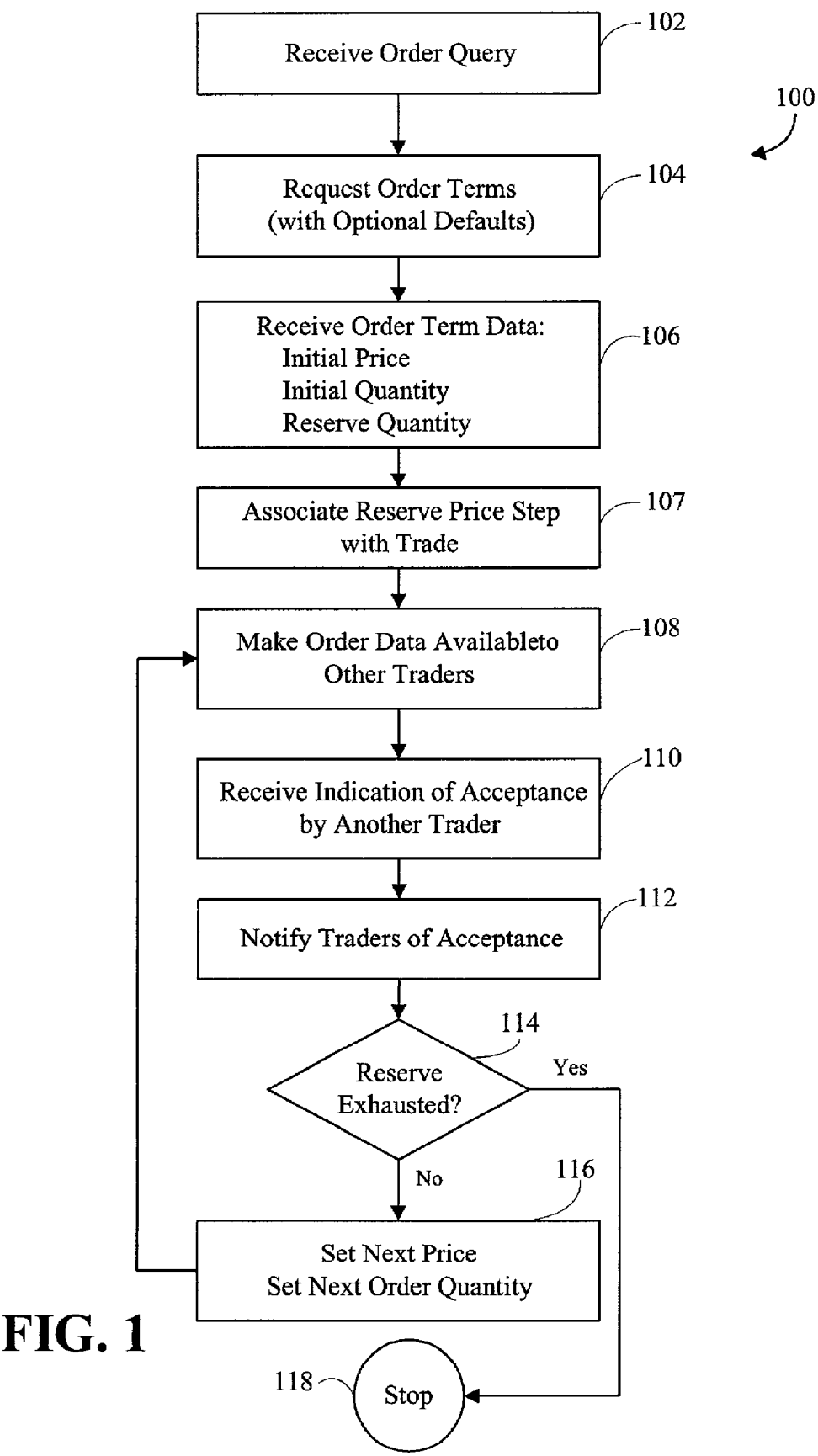
FIG. 1 is a schematic diagram of a preferred process, suitable for implementation using automatic data processing equipment such as a computer system, for trading financial interests using reserves according to the invention.

FIG. 1 is a schematic diagram of a preferred process, suitable for electronic implementation using automatic data processing equipment such as a computer system, for trading financial or other interests using reserves according to the invention.

Process 100 of FIG. 1 begins at 102 with the giving to the computer system, by a trader or other system user, of an indication that the trader/user would like to enter an order or quotation, such as a buy or sell order, for an interest for consideration by other traders, and optionally for acceptance and execution of the order by such other traders, preferably with the assistance of the computer system. Generally computer systems according to this aspect of the invention accommodate the giving of such indications by enabling the trader to indicate that he/she wishes to trade an interest, and further to designate terms for an order in that interest that the user wishes to place. For example, the computer system may cause a computer interface screen display to appear on the user's terminal, the screen display enabling the user to inform the system, through the use of standard input/output devices, that he or she wishes to place a buy or sell order for a financial interest.

In response to the user's query at 102, at 104 the system elicits particulars of the user's desired order, or otherwise enables the user to designate them. Preferably the description comprises an identification of the interest (which may include an indication of the type of interest involved—e.g., equity interests, fixed income interests, commodities, or forwards interests), an initial price, an initial quantity, and a reserve quantity, and an indication whether the order is a bid to purchase or an offer to sell the identified interest. Optionally terms designated by the user further include a reserve quantity increment, although the reserve quantity increment may also be set by the computer system automatically, based on previously defined logic rules. For example, the reserve quantity increment may be set by default to equal the initial order quantity, or a selected percentage of initial order quantity or a selected percentage of the designated reserve quantity, subject to minimum quantity requirements, etc. As will appear to those of ordinary skill in the art, part of all of the description of the interest and the nature of the order may be included in the initial user inquiry, so that step 104 may satisfied immediately at step 102.

Optionally, at 104 the system presents one or more default order terms—for example, minimum initial order price and/or quantity, reserve quantity increment, and/or price step. Preferably such defaults, where presented, may be overridden by the user, subject to any customary or regulatory restrictions, or confirmed by the user upon entry of the order.

At 106 the system receives as input terms of the user's order, and confirms any default selections made or acquiesced in by the user. Preferably the computer system stores the user's order data for future processing.

At 107 the system associates a reserve price change, or step, with the trade. Association may be made by the system alone, as for example by providing default values, or by the user and the system. For example, the user may specify the amount of the change or step as part of the terms of his intended order. Optionally the system provides a default amount overridable by the user.

At 108 the system makes information relating to the order available to other traders using the system. Preferably, only an identification of the interest to be traded, the initial price, and the initial quantity are disclosed to traders other than the trader who originated the order. The order may be made available to other users either by, for example, pushing the information to other traders, as for example by sending electronic mail or other data packages to such other users. As an alternative, the order may be stored within a database system to which other traders have authorized access, so that such other traders may review the order by accessing the database. For example, terms of the order may be made available within an order database, for retrieval and presentation on a market-monitoring screen displayed on one or more trader computer terminals.

At 110 the system receives an indication from another trader that he/she wishes to accept the disclosed order, and at 112 optionally so informs both the originating and accepting traders. Optionally, the system automatically matches a disclosed order with a matching bid or offer (that is, a bid or offer stating mutually-acceptable terms). Optionally, the system further executes automatically matched or otherwise accepted trades on disclosed orders, or facilitates execution by other systems.

At 114 the system determines, at some point during the process of acceptance of the order—that is, upon acceptance of the order—whether the order's reserve quantity has been or will be exhausted. If the reserve has not been exhausted, at 116 the system determines a next or subsequent order price by incrementing or decrementing, as appropriate, the previous price by the reserve price step; determines a subsequent order quantity; and at 108 reposts the order or makes the new order available to other users, as in the case of the initial order. Again, preferably, only the subsequent order quantity and subsequent order price are made available to other traders/users.

Preferably, the subsequent price is determined by adding the reserve price step to, or subtracting it from, the previous price. In many instances it is preferable to subtract the reserve price step from the previous price in offer orders, and to add the step to bid orders. This can help, for example, to keep a desired trade moving in the market, and helps to ensure that a trader will always be able to buy at the lowest possible price and sell at the highest possible price. However, as will occur to those familiar with the buying and selling of financial interests, this is not always desirable, and preferred systems according to the invention enable a trader to determine whether the price step is positive (i.e., an increment) or negative (i.e., a decrement). Subsequent order quantity is generally set at whatever reserve quantity increment has been set by the user or the system. Preferably, the system also determines a remaining reserve quantity equal to the previous reserve quantity less the subsequent order quantity (generally the reserve quantity increment), and stores this remaining reserve quantity in a database for use in accordance with steps 108-116 following any further trades pursuant to the current order.

Setting at 116 of a subsequent price and subsequent order volume, and/or making the subsequent order portion available to other traders at 108, is either fully or partially automatic. That is, the subsequent price may be set, and the new order portion disclosed, with or without any intervention by the trader who entered the order. For example, definition and disclosure of the new order terms may or may not be conditioned upon confirmation by the trader who posted the original trade. The trader may, for example, be enabled to confirm that he/she wishes to continue with the automatically established subsequent price and subsequent order quantity, modify terms of the subsequent order, or cancel the stepping and redisplaying process. In event of cancellation, remaining portions of the order may be held for later posting or cancelled.

Loop 108-116 repeats until the reserve has been exhausted or the user has cancelled the process. Upon a determination at 114 that the reserve has been exhausted (that is, the remaining reserve is equal to zero) or that the user wishes to stop, the process stops and optionally the system returns to other functions.

System Architecture

Figure 2:
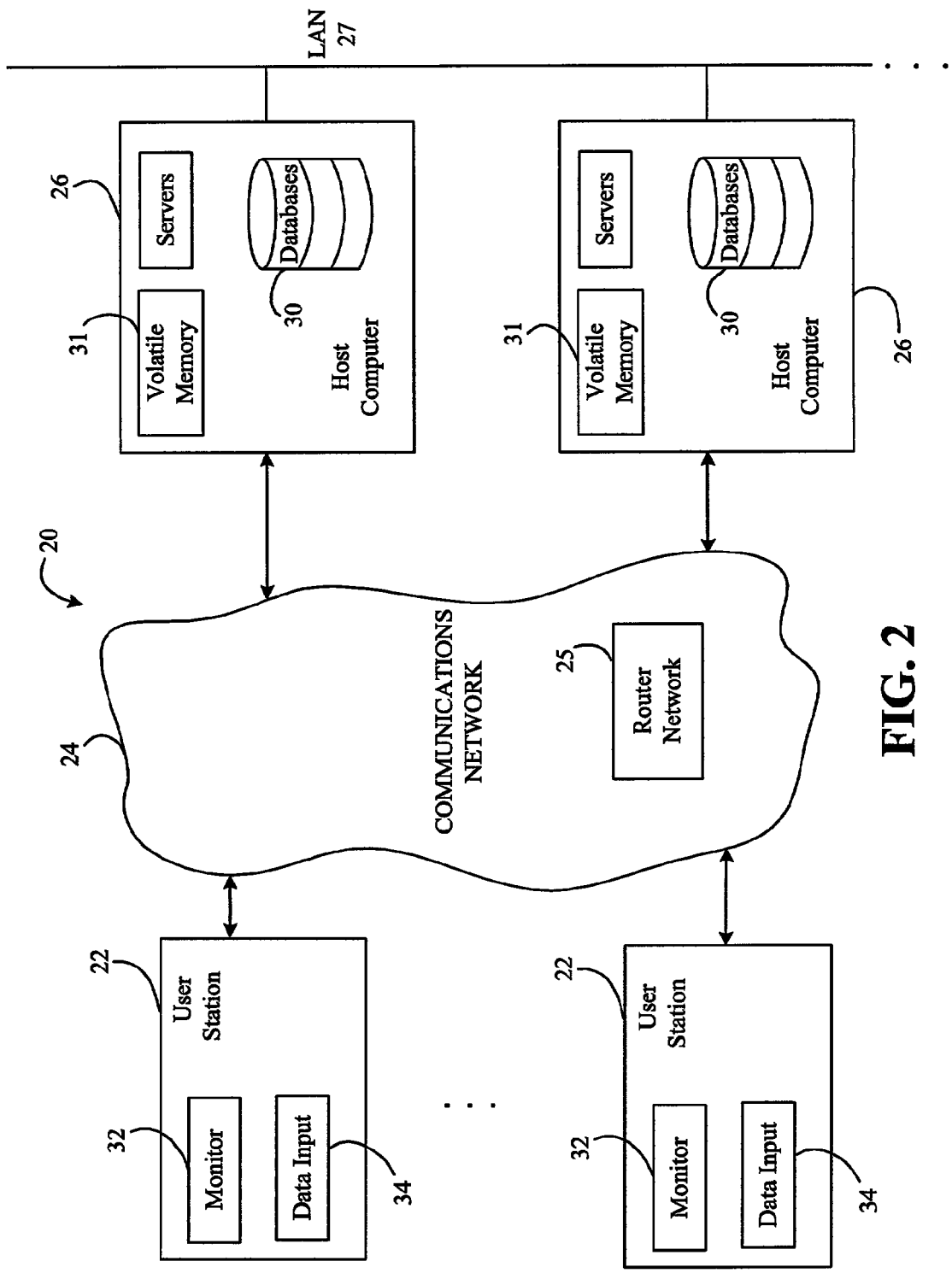
FIG. 2 is a schematic diagram of a computer or data processing system suitable for use in implementing methods of trading financial interests according to the invention.

FIG. 2 depicts a trading and information system 20 adapted for trading of financial interests having stepped reserve prices according to the invention, and in particular as described in FIG. 1. System 20 includes a plurality of user stations 22, communications network 24, and host computers 26 connected in a local area network (LAN) 27. User stations 22 and host computer 26 operate in a client/server architecture. Each user station 22, e.g. a "thin client", is enabled to run one or more applications supported by one or more host computers 26.

Each host computer 26 may include those databases 30 specific to the particular application or applications supported by that host computer, and may also include volatile memory 31 shared by various functions performed by the host. When a particular application is being run, for example, all or part of its related databases 30 may be loaded into the host computer's volatile memory 31. Each host computer 26 may manage data storage and retrieval for the application it supports, and may include a crash recovery database for use in the event the host computer crashes. The user stations 22 include at least one monitor 32 (typically more are provided) or other output devices and data input devices 34 such as, for example, a keyboard and a mouse or other pointing device.

Communications network 24 typically includes a router network 25, which can determine, for example, a particular host computer 26 or other system responsible for supporting a particular application currently running on or at the command of a particular user station 22, and which typically routes communications between user stations 22 and appropriate host computer(s) 26.

Figure 3:
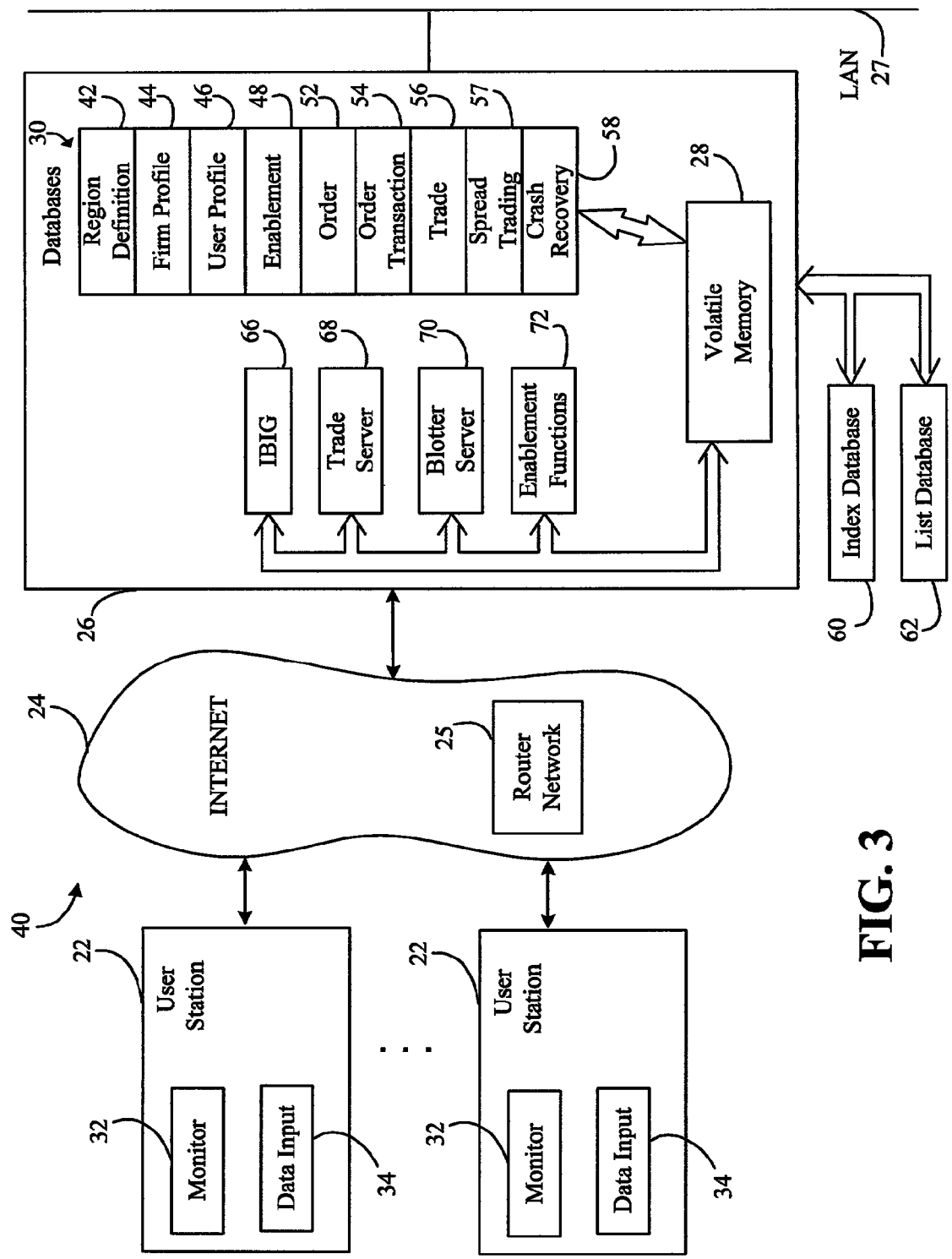
FIG. 3 is a schematic diagram of a computer or data processing system suitable for use in implementing methods of trading financial interests according to the invention.

FIG. 3 comprises a more detailed schematic representation of a host computer 26 suitable for use with and implementation of methods according to the invention, in the context of the system 20 of FIG. 2. Such a system is well adapted, for example, for trading financial interests in energy according to the processes described in commonly-assigned U.S. patent applications Ser. No. 60/152,017, entitled "Electronic Trading System for Electricity Forwards" and filed Sep. 1, 1999, and Ser. No. 09/584,045, entitled "Electronic Trading System for Electricity Forwards" and filed May 30, 2000; and International Patent Application PCT/US00/22109, entitled "Electronic Trading System for Electricity Forwards" filed Aug. 14, 2000. The specification of each of these applications is incorporated in full, as if set forth fully herein, by this reference. Such a system is currently embodied in the BLOOMBERG POWERMATCH® system for trading energy and other financial interests.

Host computer 26 is, for example, a large server such as those which are available from the Data General corporation, suitable for the management and support of a number of databases. In the BLOOMBERG POWERMATCH® system, for example, databases such as the following have been provided for facilitating automation of processes of the type described herein, and others:

- Region definition database 42. Each record defines region information—region number, number of the list of securities for that region, server process name and number, minimal order quantity, region title, and any other region-specific information.
- Firm profile database 44. Each record defines a separate account—so, for example, if a firm has more than one account, it has several records. The record stores firm name, contact information, commission rates, back office e-mail addresses, various profile flags, and any other firm-specific information.
- User profile database 46. The BLOOMBERG POWERMATCH® system 40 is proprietary. Only specially enabled users can trade on it. The user profile database stores, for each enabled user: user name, number, contact information, access level, access flags, and any other user-specific information. User levels include, for example: 0—view only, 1—regular trader, 2—firm administrator, 3—system administrator, 4—master.
- Enablement database 48. Every pair of firms has a record, which contains month-by-month buy and sell flags. This database determines whether the two firms of each pair can see each other's orders and trade against each other.
- Order database 52. Every order entered into system 40 is stored in this database keyed by date/region/sequence number. Filled and canceled orders are maintained in this database under the appropriate status.
- Order transaction database 54. Whenever an order is changed, a record explaining the change is added to this database. This database stores and allows viewing of order audit trails.
- Trade database 56. When a trade in a financial interest occurs, a record is created in this database which includes buyer/seller information, identity of the aggressor, commission rates, trade price/rate/total trade quantity, date, time, and other relevant trade data.
- Crash recovery database 58. This database exists primarily as a failure recovery measure. It stores status of all users currently running trading functions. If a trade server fails and is brought back up, this database is capable of immediately reloading all required current data, and restoring all users without them even knowing that a fails occurred.
- Index database 60. This database stores commodities, indices, futures, and many other securities, as well as the electricity products traded using the BLOOMBERG POWERMATCH® system 40.
- List database 62. This database stores a series of lists of securities, one list for every defined region determining which securities are traded there, and in what order to display them on the monitor.

Figure 4:
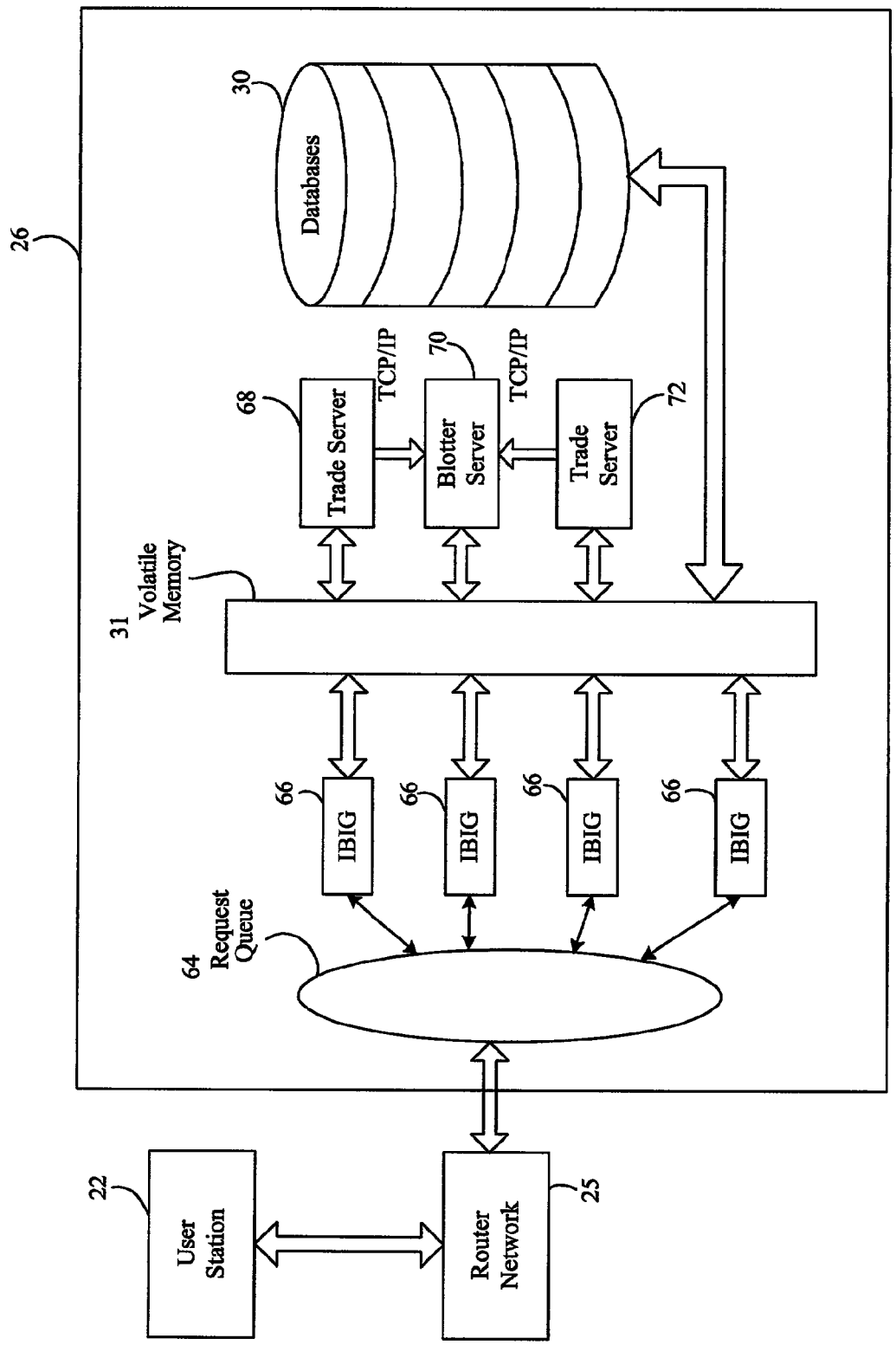
FIG. 4 is a schematic diagram of a computer or data processing system suitable for use in implementing methods of trading financial interests according to the invention.

FIG. 4 illustrates process flow for trades within system 40. System commands, or functions, are run on or controlled by computer 26, which includes an incoming request queue 64; a system of screen event handlers such as auto-execution specific AEBIGs or, preferably, system-independent event handlers such as IBIGs 66 (the use of system-independent event handlers facilitates transfer of the system from one host computer to another, if required); trade servers 68 implementing trade command functions; and a blotter server 70 implementing blotter and other bookkeeping functions. Optionally also included are administrative and commercial systems such as for example a commission rates database (not shown) that stores commission rates established by an operator of the system and charged to various users/traders for various activities. Event handlers 66 are implemented in software on host computer 26. Similarly, incoming request queue 64 is implemented in software on host computer 26. Trade servers 68 and blotter server 70 are enabled to access volatile memory 31. The host computer 26 further includes volatile memory 28 and system databases 30, which include 42-58 shown in FIG. 3.

Referring to FIGS. 3 and 4, a user station 22 running a trading system application forwards a request to router network 25 via communications network 24. Routers in the router network 25 identify the particular host computer 26 responsible for supporting the application running on or accessed by the requesting user station 22, and route the request to the appropriate host computer 26. User requests from a user station 22 arriving at host computer 26 are queued in queue 64, and distributed between several instances of execution screen event handler 66 for processing. Trade activities in the queue are passed to an appropriate trade server 68. System administration functions may be handled directly by an instance of the execution screen event handler 66. Bookkeeping events are handled by blotter server 70. Trade servers 68 are responsible for updating order, trade, and transaction databases. They also report all order and trade updates to blotter server 70. Communication among execution screen event handlers 66, trade servers 68, and blotter server 70 are via TCP/IP socket or other suitable connections.

Processing is conducted by "point and click" methods as follows:

1. User station monitors 32 are provided with image areas selectable by positioning of a cursor within ("pointing" to) a selected image area and activation of a control button on a mouse ("clicking"), or analogous functioning of other pointing devices. Each such "clickable" region on a user station monitor 32 has a number associated with it. Upon clicking of an area, an event is sent to an event handler (IBIG) server 66, which sends the clickable area number to the appropriate trade server 68 via a message queue/shared memory IPC scheme.
2. Upon receipt of the message, the trade server 68 checks the user and firm permissions and status, determines what class of clickable has been clicked, and in what monitor line.
3. Upon determining the clickable class, the trade server processes the request identified by the click accordingly, updates any database as appropriate, and sends the result back to the event handler (IBIG) 66, which forwards appropriate screen information to the user station of the clicked screen and releases the event handler 66 to process the next incoming screen event.
4. Screen refreshing and updating proceeds as follows. Each user screen is refreshed cyclically, e.g., every second, to update information displayed on the screen. For each refresh, a comparison is made between a stored prior screen and a prospective new screen. Only differences are updated, unless there are substantial changes which requiring "repainting," or reimaging or refreshing of the screen. For example, a screen may be repainted where the order structure has changed, e.g., after a trade was executed, or an order was modified or canceled or a new order placed, and new functionality or substantially different input is required from the user. As part of the screen repainting procedure, a short term event queue (implemented in software) is maintained. This information in this queue includes highlight and flash information and timer information for each flash and highlight. For each repaint, the short term queue is checked to determine whether there is an active flash or highlight for any part of the screen. As part of screen refreshing, the appropriate trade server checks for the presence of bilateral counterparty enablement (discussed below). If an enablement change occurs, the initiating party is "blinded" (discussed below) and all orders of the blinded party are removed from the screens of other parties. The trade server provides a user mode (data record) for each user which stores relevant data about a user. The user mode includes counters for the number of orders placed by the user and the number of orders (per region) suspended by the user. Canceling an order decrements the counter and adding an order increments the counter. If the suspended order counter is decremented to zero in the "suspend" mode, the user is returned to live trading.

User Interface

User interfaces suitable for use with the invention comprise any input/output devices or systems adapted or adaptable for accomplishing the purposes set forth herein. For example, keyboard—display combinations have been shown to work satisfactorily. However, it should be borne in mind that any system satisfactory for accomplishing the purposes described herein will serve. A wide variety of standard and special purpose interface devices are commercially available.

An example embodiment of a computerized method for trading of financial interests using reserves according to the invention is being incorporated in the BLOOMBERG POWERMATCH® system. The BLOOMBERG POWERMATCH® system was originally intended for the trading of financial interests in energy, for example, forward contracts for electricity. It now facilitates trading in many other interests as well—including electricity and natural gas forwards, emission rights in industrial by-products, and currency exchanges, for example. The invention is equally useful and advantageous, however, when applied in the trading of: equities such as stocks; fixed-income instruments such as bonds, mortgages, and commercial paper; commodities; and many other types of financial interests.

The BLOOMBERG POWERMATCH® system is typically embodied on a client-server network system like that shown in FIGS. 2-4, with client terminals providing user interfacing comprising one or more display monitors, upon which interactive screens may be presented, and input devices such as keyboards, mice, and other pointing and/or selecting devices.

The BLOOMBERG POWERMATCH® system provides a number of functions for trading financial interests. Each function presents a series of one or more interface screens on the user monitor, each screen presenting and eliciting data in an interactive format generally similar to those of many other modern computing systems.

The primary trading function in the BLOOMBERG POWERMATCH® system is the EMON function. This function is more fully described in the incorporated references. The EMON function may be invoked by entering "EMON" at the Bloomberg command line, together with variables including a unique character string to identify a particular financial interest or interest type to be traded. For example, a trader using the system and wishing to trade in electricity forwards in the Northern Pacific NP15 market may enter the "EMON" command, resulting in the presentation of a list of tradable interests or groups of interests; the trader would then select an item number corresponding to the group comprising NP15 electricity forwards. Thereupon the trader's user monitor would display a screen like that shown in FIG. 5. The amount, type, and arrangement of data displayed on the EMON screen 1000 depends upon the type of financial interests displayed. In general, the screen is divided into two portions: the left, or "market," portion 1001 of the screen comprises all orders visible to all system traders; the right, or "user," portion 1002 shows only orders entered by the individual trader/user using the client terminal upon which the screen is displayed. In the case of interests related to forward commodity contracts, market and user portions 1001 and 1002 of the screen 1000 are separated by a center column 1003 headed "Forward" and showing starting dates for forwards contracts. Data in both the market and user portions of the screen is sorted on a row-by-row basis according to term starting date.

Figure 5:
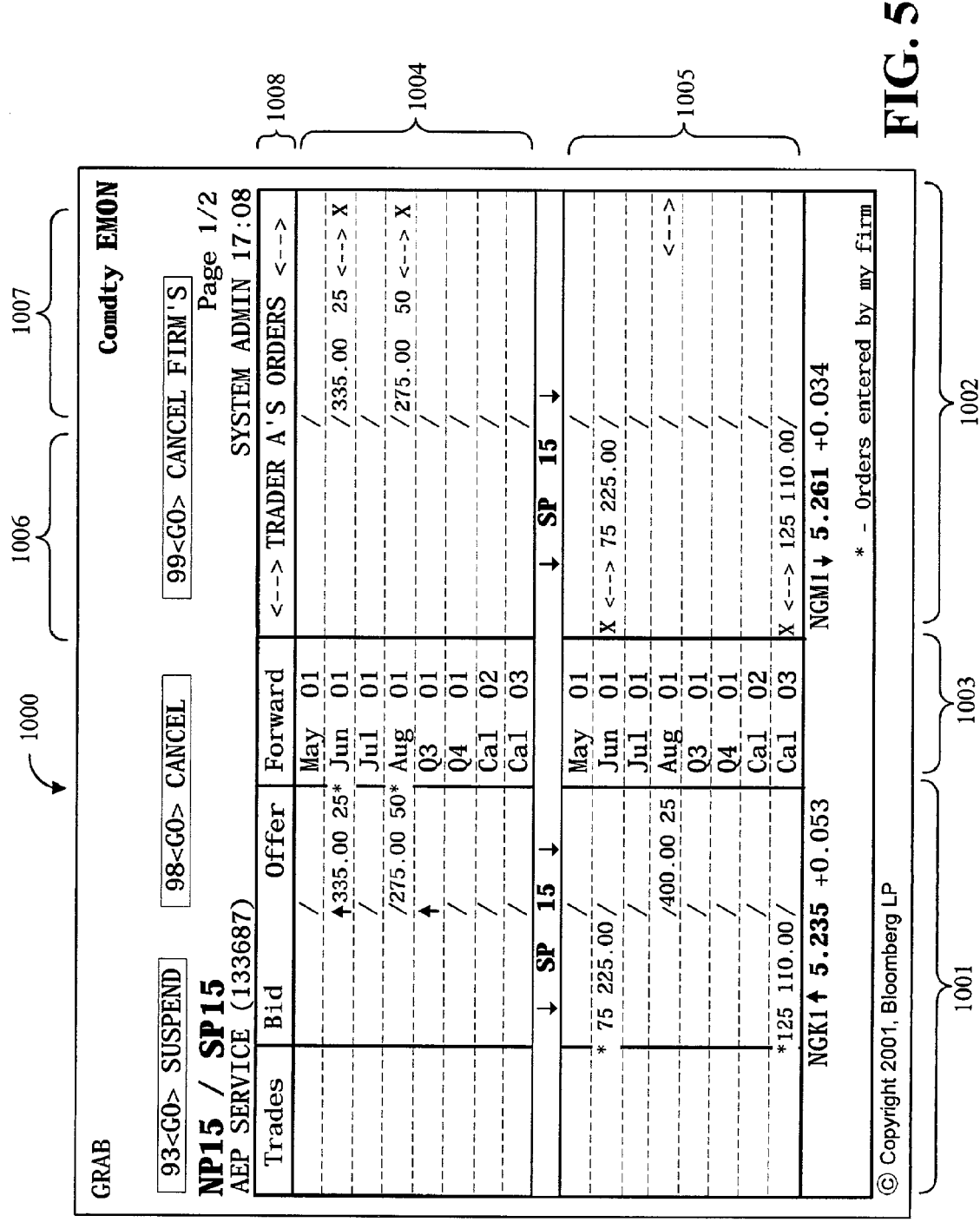

EMON screens may also be divided horizontally to display interests of different types. In the particular case shown in FIG. 5, the screen is further divided to upper and lower portions 1004, 1005 respectively, each carrying data related to a different regional energy market. Upper portion 1004 of the screen 1000 in FIG. 5 shows data related to the NP15 market; lower portion 1005 carries data related to the SP15 market. Depending upon the number and nature of interests displayed, a single screen may display all or part of orders related to only one particular market, or to several markets.

In the case of energy futures contracts such as those traded in the NP15 regional market, data in market portion 1001 of screen 1002 is presented in columns bearing headings "Trades," "Bid," and "Offer."

The "Trades" column carries a listing of the most recent executed trades for the particular months designated in the center forward-term column. The Trades column of Screen 1000 of FIG. 5 is empty; it shows no recently executed trades. In the event that more than one trade exists to be reported for any given forward term date, multiple lines or rows may be displayed, each showing the same forward date and one or more distinct trades.

The "Bid" and "Offer" columns of public portion 1001 of screen 1000 show best active bids and offers entered by BLOOMBERG POWERMATCH® system users authorized to trade with the user of the terminal on which the bids and offers are displayed (see the incorporated reference for further details on authorization of traders to deal with each other). Best bids/offers appear in lines corresponding to the forward date with which they are associated. They are shown in terms of quantity (in the case of electricity forwards, expressed in megawatts (MW) (delivered during the period specified by the contract) and price (expressed in, e.g., United States dollars). Preferably, orders entered by the user him/herself, or by his/her firm, are displayed in a format easily-distinguishable from orders entered by other traders. For example, different colors may be used—orders shown in amber may be orders entered by other users (typically firms), those in green the user's own. Orders entered by someone else in the user's own firm may be designated by, for example, amber coloring with an associated green, red, or otherwise colored or highlighted asterisk (*). The screen in FIG. 5 shows only one order not entered by the user's own firm: an offer of 25 Megawatts of SP15 electricity forwards on an August 1 contract, at $400.00 per MW. Optionally, orders that have been accepted, executed, modified, or otherwise changed are displayed in a different or flashing color for a selected period following the change. For example, changed orders can be shown in white for a period of approximately five seconds, in order to indicate to traders watching the screen that the order has recently changed.

User portion 1002 of screen 1000 is also divided into bid and offer columns. Bid column 1006 is on the left, offer column 1007 on the right. A user identification label is provided at 1008. Orders are shown in the same format as on market portion 1001 of the screen, indicating both price and quantity.

Entering an Order with Stepped Reserve Price

A user/trader of the BLOOMBERG POWERMATCH® system may enter an order or quotation according to process steps 102 and 104 of FIG. 1, using the EMON screen (e.g., screen 1000 of FIG. 5), by selecting a blank data entry area in appropriate side of the "Bid" and "Offer" areas of user portion 1002. This results in presentation, according to process step 104 of FIG. 1, of an "Add New BID" or "Add New OFFER" screen, depending upon which portion 1006 or 1007 of user portion 1002 is selected. For example, a trader wishing to enter a bid for a 1 May contract on Palo Verde regional electricity forwards would enter the identifier "P-V" at the BLOOMBERG POWERMATCH® command line, which would result in presentation of a screen such as that shown in FIG. 5 but containing Palo Verde order data. Placement of the cursor in and selection of (that is, "pointing" at and "clicking") a blank data field on bid side 1006 of a "May 01" line would result in presentation of an "Add new BID" screen such as screen 1010 shown in FIG. 6. Selection of a data blank on "offer" side 1007 of user portion 1002 would result in presentation of a similar screen entitled "Add new OFFER".

Upon presentation of an Add new BID or Add new OFFER screen, the user/trader may enter pertinent order data. In preferred embodiments such as that shown in FIG. 6, additional relevant information is presented for the user's reference. In FIG. 6, which concerns a bid for forward electricity contracts, presented data includes:

| | |
|---|---|
| Delivery: | Where the commodity can be delivered to fill the contract. |
| Type: | The type of contract. |
| Days: | The total number of days covered by the contract, and days of the week for which it is effective, if applicable. |
| Dates: | The dates for which the contract is in effect. |
| Hours: | The hours of delivery. |

User/trader-defined terms of the order are entered by positioning the cursor within and selecting the appropriate data field, and then typing the desired term. Required data includes the price and quantity of the initial order, and any reserve quantity and step amount. Initial price 1011 is optionally expressed in terms of currency per unit commodity. In the Palo Verde electricity forwards example, the price is indicated in United States dollars (USD) per Megawatt for delivery during the specified days and hours during the contract period. Initial order quantity 1012 and reserve quantity 1013 may be expressed in any convenient or relevant quantities, for example, in the electricity example, in MW delivered during the relevant period. Reserve price step amount 1014, which is sometimes referred to (as for example in FIG. 6), as the "scaleback" amount, is preferably expressed in units of the same currency as the price.

By default, the change designated for the reserve price, or the "step" or "scaleback" amount 1014 may be set to zero, or to a positive amount, or increment, for bid orders, and to a negative amount, or decrement, for offers, in order to provide impetus to keep follow-on orders for the reserve quantity moving. Alternatively, the user may be required to indicate whether the step is positive or negative by, for example, entering a "−" sign when the step is negative and/or a "+" sign when the step is positive. Preferably default step signs (i.e., positive or negative) may be overridden by the user.

If no stepped price is desired for the reserve, price step 1014 may be set to zero.

In many financial markets or sub-markets, items such as quantity and price are set customarily, or are defined by particular market makers, in established increments with minimum order quantity requirements. For example, in the U.S. electricity market, 25 MW quantity increments are customary, and the following default price increments for reserve price step are set by the BLOOMBERG POWERMATCH® system:

EAST POWER, including the Cinergy, Entergy, PJM, NePool, New York, and Ercot regions:
  Short term power—$0.25/MW
  Forward power—$0.05/MW WEST POWER, including the Palo Verde, Cob, Mid-Columbia, NP15, and SP15 regions:
  Short term power—$1.00/MW
  Forward power—$0.25/MW Preferably systems according to the invention permit use of price increments, or steps, 1014, such as these as limits for setting minimum order prices, and as steps or increments in stepping reserve prices. Optionally such systems further provide for overriding of such increments and defaults.

As a further example, in the natural gas markets, including for example the Northeast, Mid-Continent, Gulf Coast, West, and OTC Nymex markets, price increments are set per thousands of cubic feet at standard temperature and pressure: for all pipes excluding OTC NYMEX—$0.0025/1000 MMBTU; for OTC NYMEX—$0.0050/1000 MMBTU.

It should be noted that currencies and quantity units used in the sale of financial interests according to the invention may include any currencies and quantity units suitable for use in trading such interests. For example, on the BLOOMBERG POWERMATCH® system U.S. electricity forwards are traded in U.S. dollars, while German electricity forwards are traded in Euros.

Figure 7:
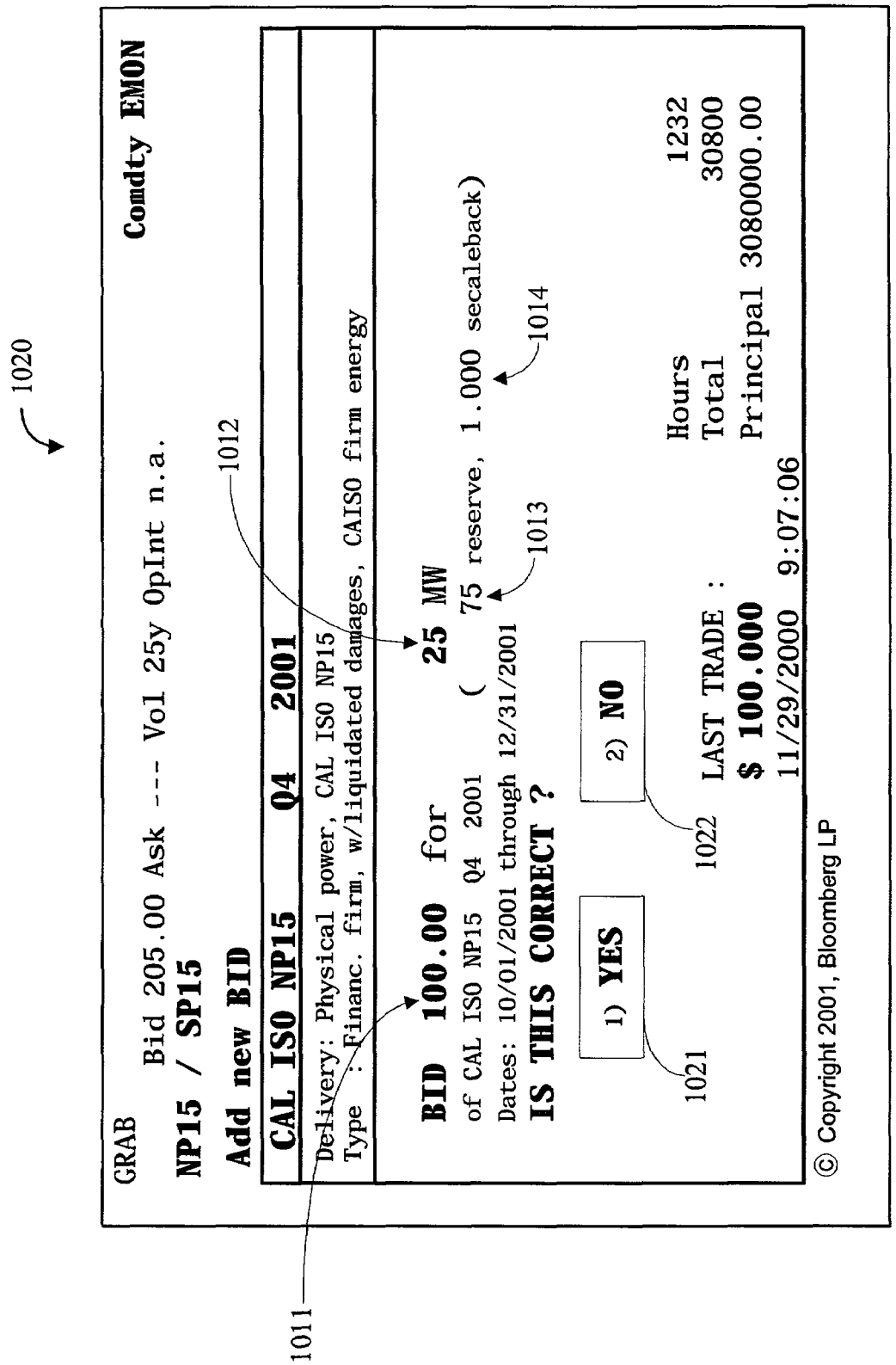

When the user is satisfied with entered order data, he/she user enters a <GO> or other execution command. This causes the system to receive the input order terms according to process step 106 of FIG. 1. Optionally, an order confirmation screen such as that shown in FIG. 7 is displayed. The order confirmation screen may display previously input data and a selectable confirmation object, e.g., a "yes button," which, when selected, confirms the content of the order and causes the system to receive the input order terms according to step 106 of FIG. 1. FIG. 7 represents a confirmation screen 1020 confirming a bid for a series of fourth-quarter forward contracts, starting with an initial quantity 1011 of 25 MW of NP15 electrical power at an initial price 1012 of $100.00 per MW, with a reserve quantity 1013 of 75 MW and a reserve price step 1014 of 1.000. Confirmation is made by selecting "yes" portion 1021 of screen 1020, or denied by selecting "no" portion 1022.

The new or modified order information having been confirmed, the system stores the order in databases 30 of FIGS. 2-4, and makes the order information available to other traders according to process step 108 of FIG. 1. For example, the EMON screen for the appropriate region may be re-displayed with the new order, preferably in a distinctive font or color to denote that it belongs to the user him/herself, displayed in the appropriate "Bid" columns 1030, 1006 or "Offer" columns 1031, 1007 in market portion 1001 and user portion 1002 of screen 1000. For example, the order confirmed in FIG. 7 is shown in columns 1030 and 1006 of FIG. 8, at row 1036.

Preferably reserve quantity 1013 price step 1014 are not shown in market portion 1001.

An existing order can be modified by selecting the desired order on user portion 1002 of screen 1000. This results in presentation of a "Modify BID" or "Modify OFFER" screen such as that shown in FIG. 9. Modify BID screen 1040 of FIG. 9 is similar to "Add new BID" screen 1010 of FIG. 6, but with data entry fields already filled (in this case, with data reflecting the order discussed above at row 1036 of FIG. 8). Desired data is changed by selecting the old data or the appropriate data field and typing in the new data over it. In general, once a bid or offer has been entered, it may be modified, withdrawn, or cancelled like any other order until an indication of acceptance of the bid or offer by another trader. The "Modify BID" screen is also useful to the user for confirming particulars of previously-entered orders which are not visible in user portion 1002 of screen 1000.

Preferably orders may be canceled prior to acceptance. In the embodiment shown in FIG. 8, a user's orders are cancelable by selecting the "X" presented in columns 1041 and 1042 of user portion 1002, beside the user's own orders. Optionally cancellation is subject to confirmation through use of a confirmation screen similar to order confirmation screen 1020 of FIG. 7.

In preferred systems such as the BLOOMBERG POWERMATCH® system, user/traders are enabled to review and check the status of their orders through use of blotter screens such as EORD screen 1050 shown in FIG. 10. Blotter screen 1050 is accessed by entering EORD at the command line. Blotter screen 1050 lists all orders placed in a given day by a particular user. For example, all of Trader A's orders entered on a particular day are shown in EORD screen 1050 of FIG. 10, including his bid for fourth-quarter forward contracts on NP15 regional electricity, which is shown in line 1) of FIG. 10. The character of an order, that is, whether it is a bid or an offer, is indicated by the presence of a "B" for "bid" or an "S" for "sell" in "B/S" column 1051. Order status is indicated in column 1055.

Optionally the existence of a reserve associated with a trader's orders is indicated on the trader's own EMON screen 1000 and EORD screen 1050 by the color or other distinctive feature of some portion of the order data. For example, in Trader A's Q4 order for NP15 contracts discussed above, initial order quantity 1012 may be displayed on screen 1050 and in user portion 1002 of screen 1000 in a distinctive font or color, as for example red or magenta if a reserve exists, green (like the remainder of the order data) if no reserve is held. In addition, the designation of a reserve price step may be shown by varying font, color, etc. For example, in a system in which the normal screen background color is black or blue, the existence of a non-zero reserve price step can be indicated by use of a white background behind the order information.

Processing, Acceptance, and Execution of Orders with Stepped Reserve Price

Upon entry and/or confirmation by the user/trader, a bid/offer order is forwarded via communications network 24 and/or router network 25 (FIG. 4) to the appropriate host computer 26 for further processing. The order is presented or made available to other traders (and optionally to the trader who entered it) by, for example, routing it back from databases 30 and server 26 to user stations 22 for posting to market portions 1001 of the traders' display screens, or by enabling the traders' systems 22 to access databases 30 containing records of the order and to post the order information themselves.

Preferably only initial portion 1011 and initial price 1012 of the order are made available to or posted on other users' screens, without indication of whether a reserve has been designated. Information relating to reserve portion 1013 and price step 1014 is generally made available only to the user by whom they were entered.

For example, a trader "A" wishing to purchase a total of 100 MW of electricity in the NP15 regional market on a forward contract for the fourth quarter of 2001, without for example skewing the market by revealing the entire size of his intended bid at once, enters an initial bid for 25 MWh at $100/MW on an Add new BID screen 1010 like that shown in FIG. 6, and confirms the order by selecting "yes" portion 1021 in FIG. 7. Trader A further posts, using the same screen 1010 of FIG. 6, a reserve of 75 MW with a reserve price step of $1.00, as indicated in FIGS. 6 and 7.

Upon confirmation, Trader A's order is displayed in market portion 1001 of his own basic EMON screen 1000, and in market portions of all other traders on the system authorized to trade with Trader A who have requested to view NP15 futures data for the fourth quarter of 2001 or earlier. This is shown, as it appears on Trader A's screen, in FIG. 8: in "Q4" (i.e., "fourth quarter") line 1036 of NP15 portion 1004 of "BID" column 1030 of market portion 1001 of the screen appears the entry "25 100.00." Identifier "NP15/SP15" at location 1033 indicates that upper portion 1004 of the screen pertains to the NP15 regional market.

This information is not only available to all traders on the system authorized to trade with Trader A, but, as will be described, is preferably executable by them. An optional "*" indicator appears to the left of the bid on Trader A's screen as an additional indicator to him that it is his own offer, or that of another member of his firm.

Figure 8:
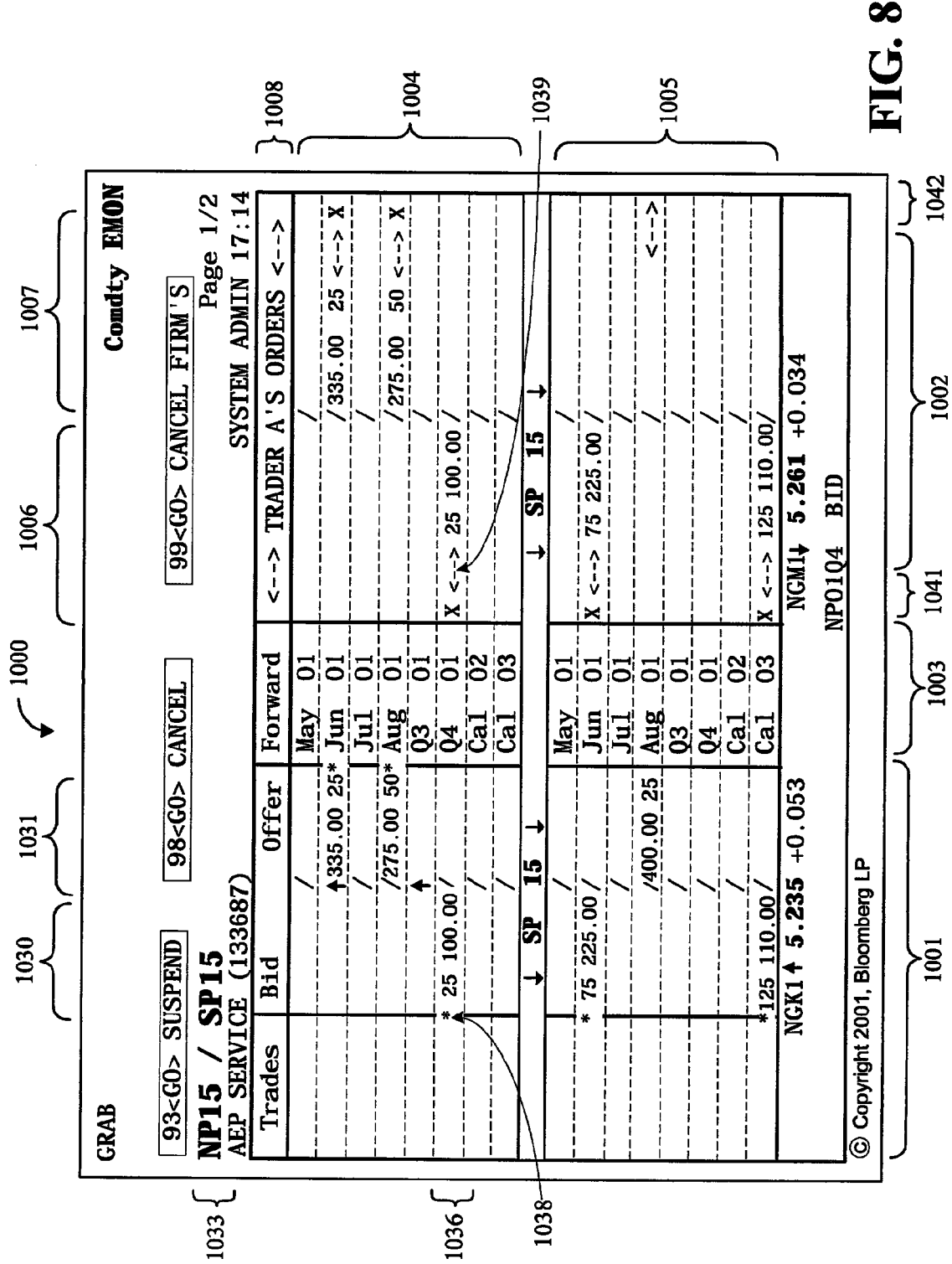

At confirmation the bid is also posted to the left-hand, or bid, side of Trader A's "own orders" portion 1002 of his screen 1000 (as shown in FIG. 8). Preferably the bid is shown on a trader's own orders in a distinctive manner, to indicate that the trader has posted the order with a reserve quantity. For example, the order quantity on the trader's own side of the screen may be posted in red.

To check, confirm, modify, or delete the reserve quantity or price of his order, a trader may select the order on his own portion of the screen. This results in presentation of a "Modify BID" (or offer) screen similar to the "Add new BID" screen of FIG. 6, with the similar data indicated. Under "Reserve" the trader can see and confirm the quantity and scaleback or price step for his reserve.

As stated, this information is also displayed on the market portion of other traders' screens. For example, the order is shown in 1001 of screen 1000 of a second trader "B" in FIG. 11, in the same location in which it appears on Trader A's screen. The only difference is the lack in Trader B's screen of asterisk 1038, shown in FIG. 8, which alerts Trader A that the order is his own or that of someone else within his firm.

Optionally, a trader is enabled to change the price of the displayed part of his order up until such time as the bid or offer is accepted by another trader. For example, in FIG. 8 Trader A is enabled to increase or decrease the price of his displayed bids by selecting one or the other of arrows 1039 displayed beside them in their respective rows until the bids are accepted by other traders. Selecting a "<–" arrow decrements the associated bid by a default amount set, for example, in accordance with the summary above (e.g., $0.25/MW for East short term power). Selecting the "–>" arrow increments the bid by a like amount.

Preferably, execution of orders posted in market portions 1001 of screens 1000 is enabled directly through use of market portion 1001 of screen 1000, and data fields located and data displayed therein. For example, a trader wishing to accept a bid or offer indicate his/her interest in the order by selecting the bid or offer in market portion 1001 of his/her screen 1000. This causes presentation of an execution summary line near the top of the trader's screen, such as confirmation line 1119 in FIG. 16. Such a line may repeat data such as an interest identifier, quantity, and price, and permit or require the trader to confirm his or her intention to accept the order, as for example by selection of "yes" item 1120 or "no" item 1121 in FIG. 16. Optionally an additional confirmation screen or item may be presented also. Upon confirmation of the intent to accept the order, an execution request to be sent to and received by, in accordance with process step 110 of FIG. 1, the appropriate system server 26, which optionally immediately executes the order. The parties are notified of the acceptance, according to process step 112 of FIG. 1, by disappearance of the order from columns 1030 or 1031 in market portions 1001 of their screens, and appearance of a notification 1009 in "Trades" columns 1057 (see, e.g., FIG. 12). The order is routed to other systems or functions for verification and closing.

At some point during the process of acceptance of the order by another trader, the system determines, in accordance with process step 114 of FIG. 1, whether, following execution, the order's reserve quantity will be exhausted. If the reserve quantity will not be exhausted, the system determines, in accordance with process step 116, a subsequent order price and a subsequent order quantity, and makes the terms of the subsequent order available to other users in accordance with step 108.

Figure 11:
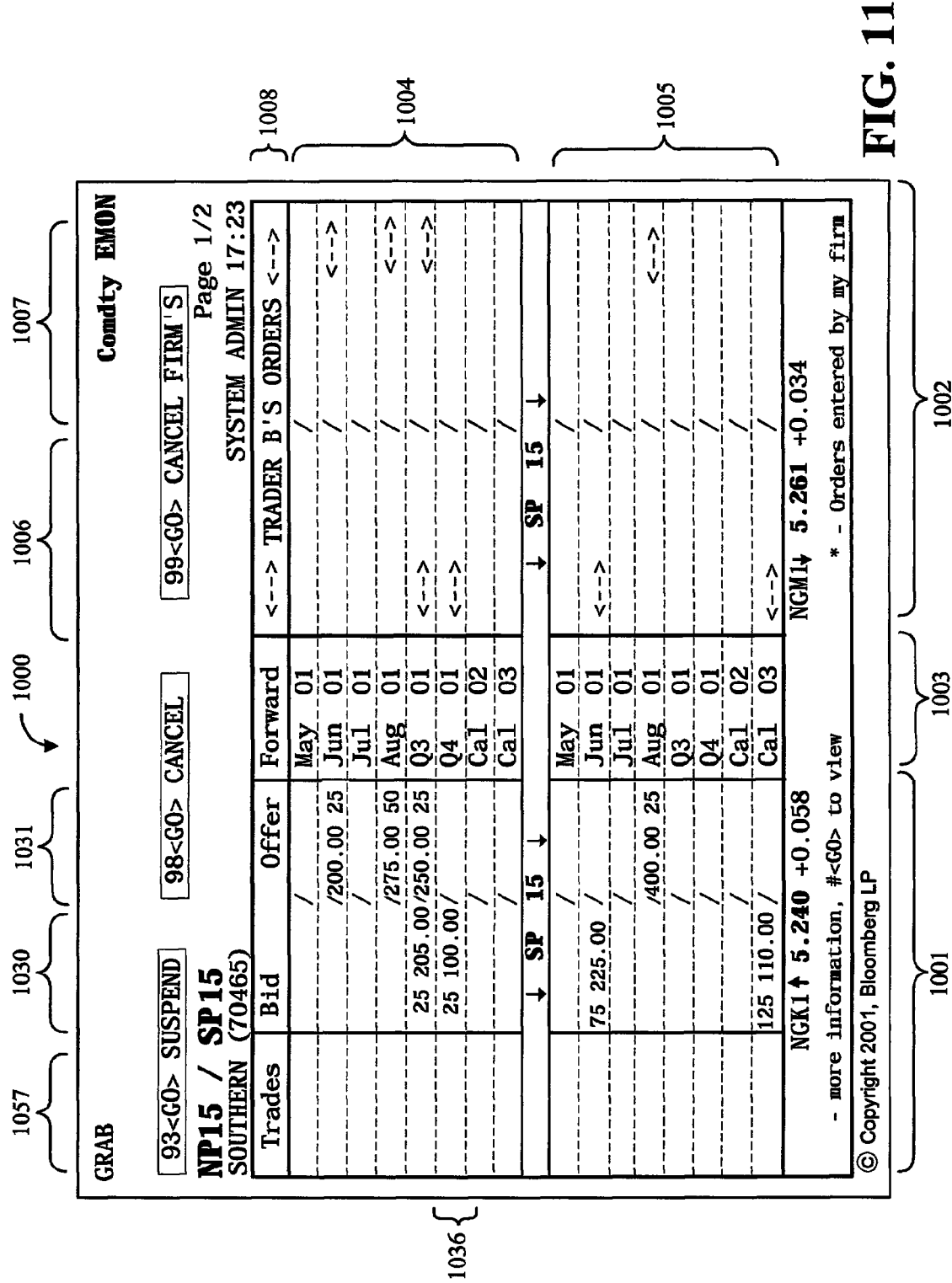
Figure 12:
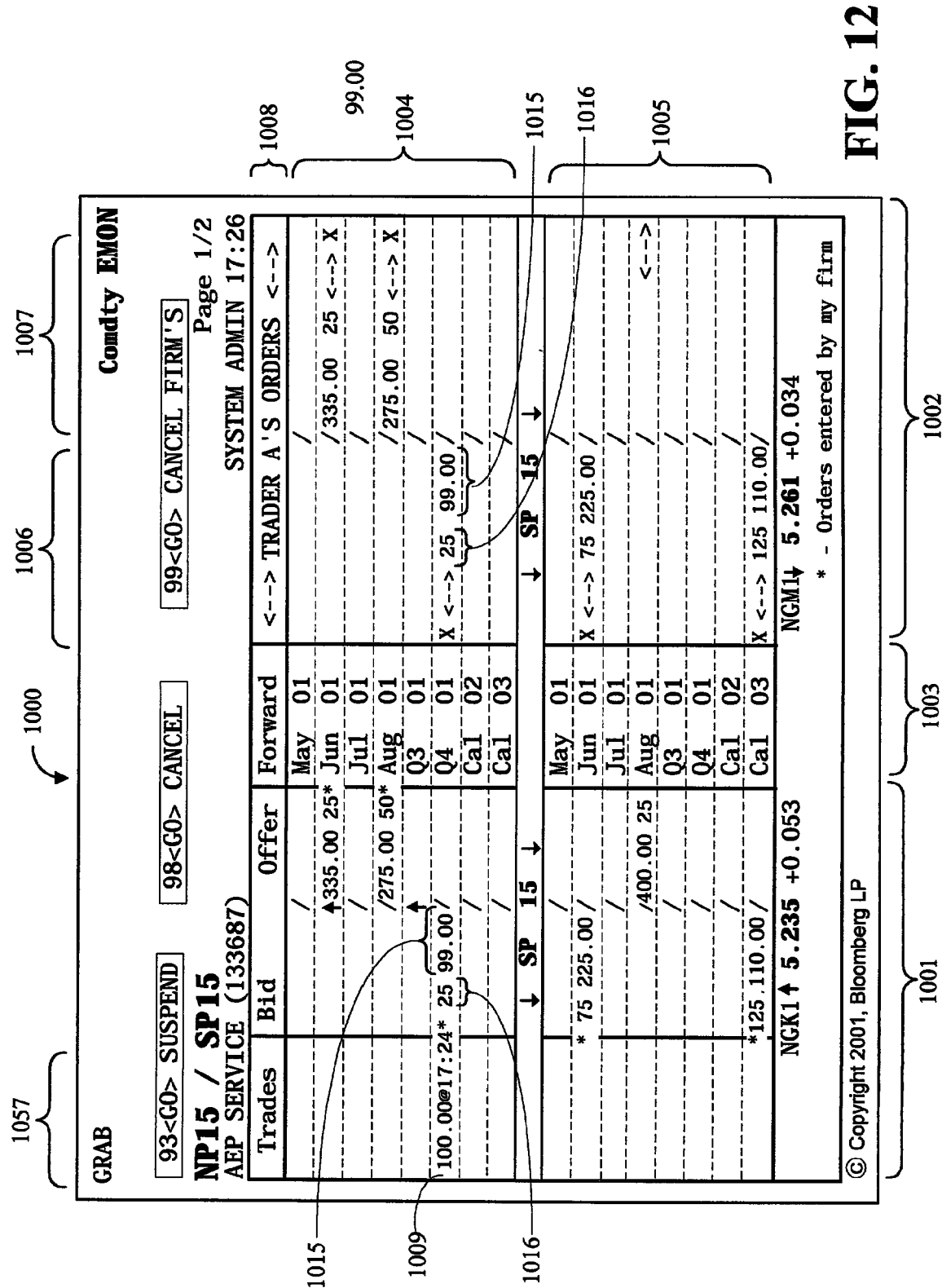
Figure 13:
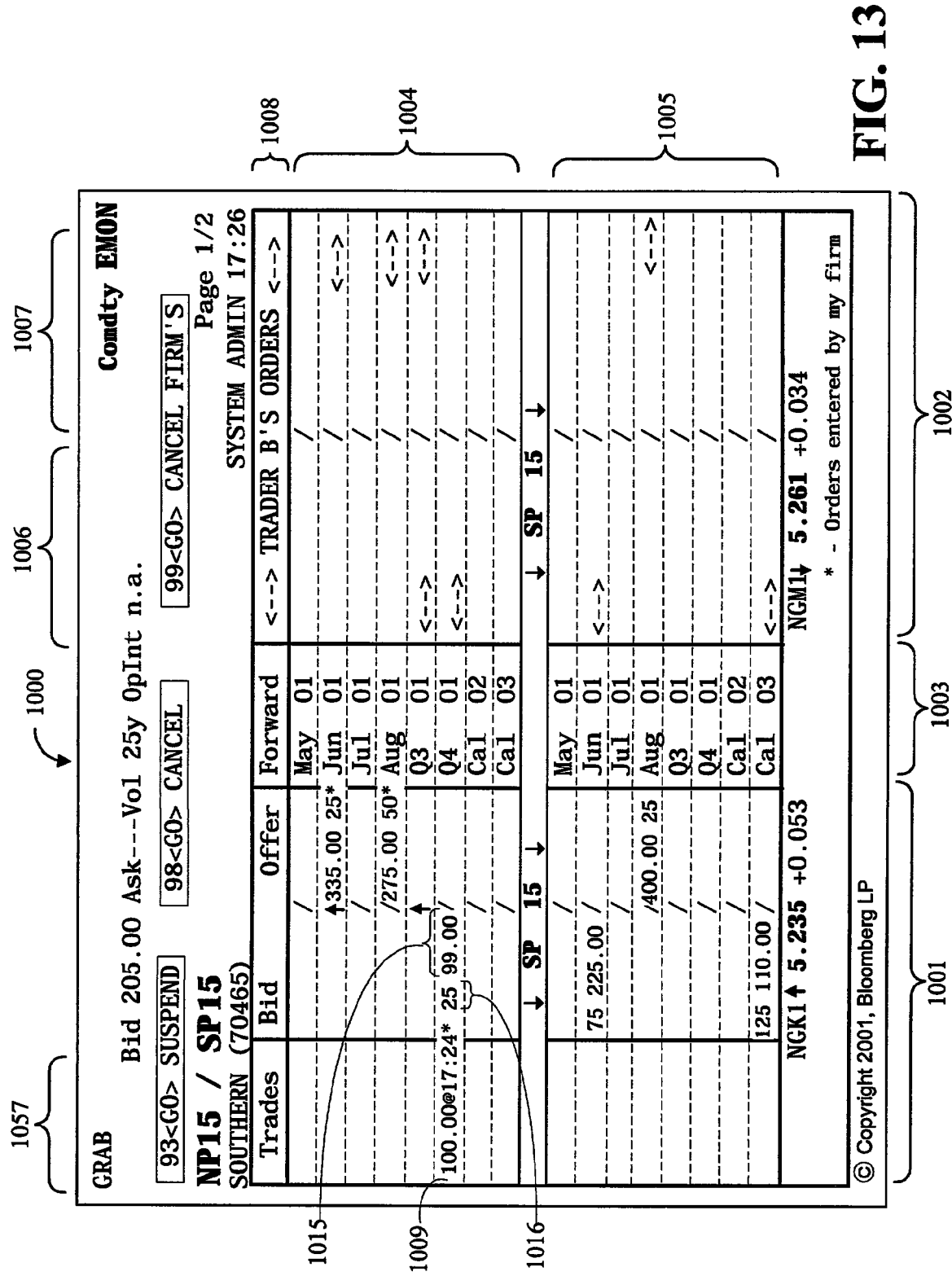

For example, upon acceptance by Trader B of Trader A's bid for NP15 forward contracts, as shown in FIGS. 11-13, the system decrements Trader A's bid price by the designated reserve price step 1014 of $1.00 and causes subsequent price 1015 of $99.00 to be displayed in those locations of his and other traders' screens 1000 formerly occupied by the initial order, and in the same manner. See, for example, FIGS. 12 and 13. The system also determines a subsequent order quantity 1016 and causes it to be displayed as well. In this instance the system has fully automatically determined and enabled the display of a subsequent order quantity 1016 equal to the original order quantity. Preferably the system also determines a remaining reserve quantity and stores it for use in case of acceptance of any subsequent trade.

Optionally the trader who entered the order (in the example, Trader A) is prompted for confirmation that he/she wishes to proceed with entry of a subsequent order for a portion of any remaining reserve quantity. For example, upon acceptance of Trader A's initial bid by Trader B as shown in FIGS. 11-13, and prior to disclosure of Trader A's next order, Trader A may be prompted by presentation of a confirmation screen. Such a screen may take a form similar to, for example, the Modify BID screen of FIG. 9 or the Add new BID screen of FIG. 7; and may enable the user/trader to confirm the automatically determined subsequent order, to modify the subsequent order, or to cancel the subsequent order. Or the screen may take the form of a simple yes/no confirmation screen, consisting of or comprising selectable yes/no items such as items 1021 and 1022 in FIG. 7.

Thus the setting of the new disclosed order price can be partially or fully automatic.

As with the initial order, Trader B or other traders authorized to trade with Trader A are enabled to initiate acceptance of the subsequent order by selecting the order in the market portion of their user screens 1000.

The process of receiving acceptance of orders, checking for exhaustion of the reserve, and determining and displaying subsequent orders continues until the originating trader (e.g., Trader A) cancels the remaining order or the reserve has been exhausted through trading.

Preferred systems according to the invention provide for further processing of accepted trades, including execution and providing for closing or completion of sales. These processes are described to a greater extent in the incorporated references.

In preferred embodiments of the invention, processing requests and data such as those described above in relation to the EMON system are sent by user stations 22 to the host computer upon which the system resides (e.g., host computer 26 of FIGS. 2-4) via network 24, optionally with assistance from router network 25. The requests are queued in queue 64, and distributed to one or more execution screen event handlers (IBIG) 66 for processing in accordance with predetermined service protocols. For example, trades are forwarded to a trade server 68. Trade servers 68 are programmed to check for irregular or illogical events, or events which violate system protocols (for example, crossing or locking the market), and to respond accordingly. Trade servers 68 update databases 30 and 52 as required. The appropriate screen information responsive to a request or screen item selection is processed by a screen event handler server 66 from information supplied by a trade server 68 and forwarded to the appropriate user station 22.

Preferably, trade servers 68 perform checks and functions such as the following (not necessarily in the order given) after a trade is confirmed. If a check fails, the prospective trade is not executed and the counterparties are notified accordingly, and preferably returned to a screen such as EMON screen 1000. Checks and functions may include, for example:

verify that a desired order is still available on attempts to accept it;

confirm that a proposed trade is not between users in the same firm;

provide the banner at the top of the screens of the counterparties confirming the term, price and quantity of the trade;

determine whether a reserve quantity exists following acceptance of an order;

determine and store, when appropriate, subsequent order quantity, subsequent order price, and remaining reserve;

insert trade data into a trade queue in the appropriate trade server 68 for the traded security (the trade queue includes queues for bids, orders and trades) for screen updating;

record trade data into the trade server database;

send a TCP/IP message to the blotter server concerning any accepted trades;

display trade data in appropriate locations and formats;

update order databases upon execution of orders;

send message to blotter server that order was filled or modified.

Compatibility with Other Trading Techniques: SWEEP Function

The trading of interests using stepped-price reserves according to the invention is compatible with many other trade techniques. For example, one technique available through BLOOMBERG POWERMATCH® and other Bloomberg systems is the "SWEEP" technique. It sometimes happens that a trader wishes to fill a number of orders (bid or offer) at the same time, in order to satisfy a need greater than can be met through any single available order. The Bloomberg SWEEP feature allows users to simultaneously aggress on a series of orders in the same financial interest. That is, the SWEEP trading feature permits the simultaneous selection and acceptance of more than one available order, and the acceptance of such orders until either a desired order quantity is filled or the set of available orders is depleted.

Combining the SWEEP technique with techniques disclosed herein for trading using stepped-price reserves can, for example, improve the speed and terms upon which traders meet their trading goals.

Figure 14:
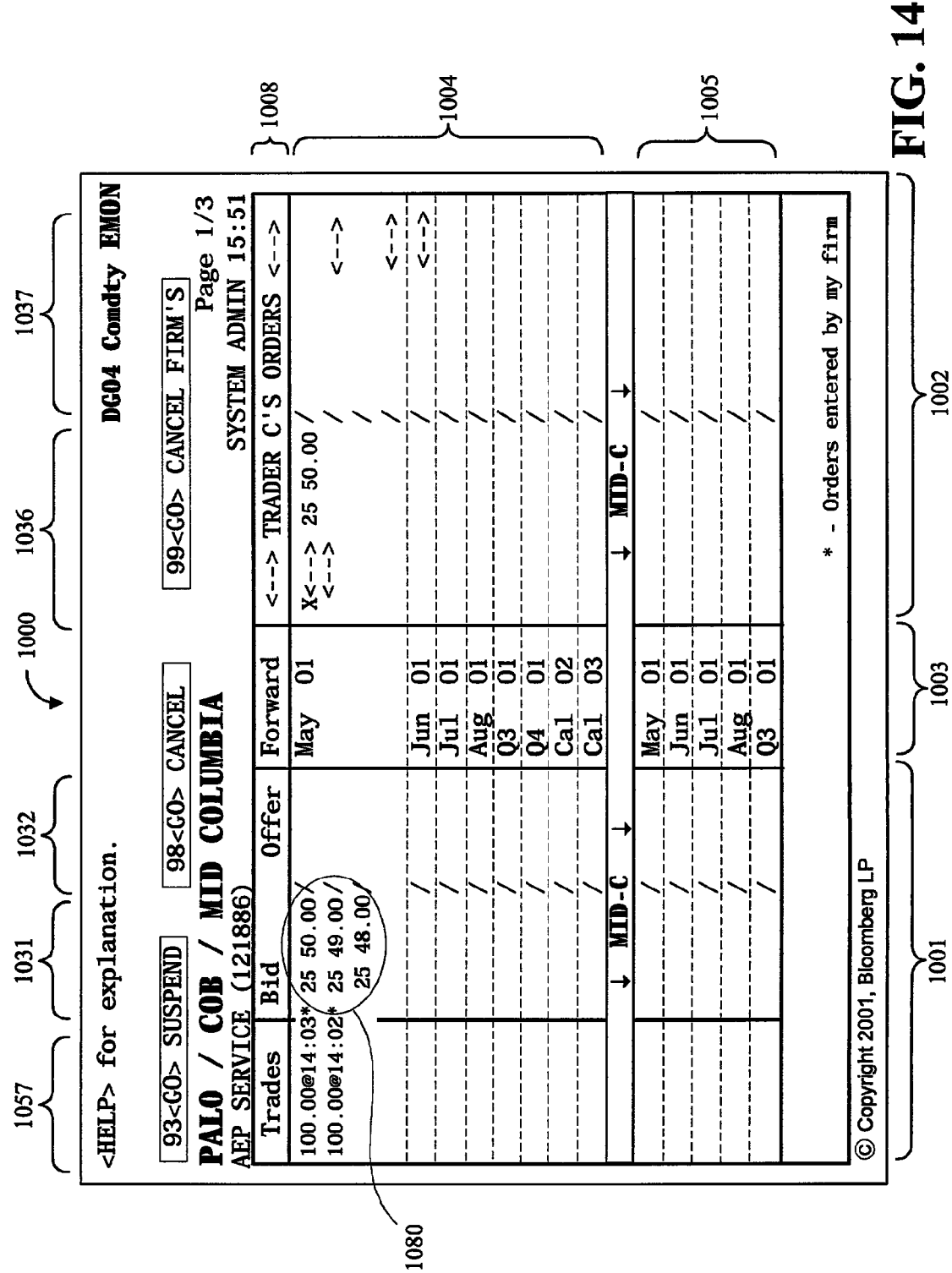

For example, in FIG. 14, market portion 1001 of trader "C"'s EMON screen 1000 shows three market bids 1080 for 25 MW each on May 01 forward electricity contracts in the Palo Verde regional market: a first bid for $50.00/MW; a second for $49.00; and a third for $48.00. The first bid, as may be seen in Trader C's user portion 1002, is Trader C's own. Moreover, as may be seen by referring to Trader C's Modify BID screen 1010 in FIG. 15, this bid is only an initial order in Trader C's total desired bid order for 50 MW/hr with a 1.00 reserve price step. (This is optionally also shown on user portion 1002 of Trader C's EMON screen 1000 by displaying the initial order quantity of 25 MW in a distinctive color or font.) Thus, Trader C has prospectively designated a reserve bid for 25 MW at $49.00 that is unknown to other system traders.

This may be seen, for example, on EMON screen 1000 of a second trader "D," as shown in FIG. 16. Trader D sees only the three orders 1080 visible in market portion 1001 Trader C's EMON screen in FIG. 14.

If Trader D desires to sell 75 MW of May 01 Palo Verde, he may designate all three visible 25 MW bids, starting by selecting the high bid, Trader C's visible $50 initial order. Upon selection by Trader D of this bid, the next bid in the queue, an unknown third trader's $49.00 25 MW becomes active (preferably indicated on Trader D's display by being highlighted or through other change in font and/or color) and can be selected also. Upon selection by Trader D of the second bid, the third becomes active. When Trader D has selected it as well, however, and sends the order for execution, the system will automatically activate Trader C's $49.00 25 MW reserve bid, which was invisible to Trader D, and execute that bid as part of Trader D's 75 MW order in lieu of the unknown third trader's $48.00 bid.

Thus Trader D receives a better-than-expected price for his sales, and Trader C completes all of his desired trade.

In preferred systems according to this aspect of the invention, bidders and sellers executing on trades involving hidden reserves will always trade on terms as good as or better than they expected. This is accomplished, for example, through application of standard BLOOMBERG POWERMATCH® rules in executing SWEEP trades. For example, the order of precedence for executing SWEEP trades among a number of designated orders, where hidden reserves are present and affect the trade, is, first price and then first-in-first-executed. For example, in the above example Trader C's 25 MW reserve bid was executed at $49.00/MW in preference to the unknown third party's bid at $48.00/MW. On the other hand, had Trader D sold only 50 MW, Trader C's reserve bid would not have executed, as the unknown third-party trader's $49.00 bid was in the queue prior to Trader C's $49.00 reserve bid.

It is to be understood that the example using the BLOOMBERG POWERMATCH® SWEEP function is intended to be illustrative of the implementation of the invention disclosed herein in conjunction with other trading techniques and/or systems. The invention is readily adaptable for use with many other trading techniques and systems.

It will be understood that the systems and software (i.e., computer program product) referenced herein, and others which may be developed, include, either explicitly or implicitly, software implemented on computers or other appropriate hardware, including other data processing devices having processors, data storage means, and the ability to support operating systems, with or without user interfaces, for example, file servers, as may be useful in achieving the purposes described herein.

Software components and applications embodying the invention can be stored or distributed in any suitable means. For example, they may stored and/or distributed in electronic bit storage on magnetic, optical, bubble, or other media, or optionally in transportable form to be interactive with an electronic reading device, for example, on computer or optical diskettes, or they may be distributed over wired or wireless networks for storage by the recipient on such media.

It will further be appreciated that such media-stored software constitutes an electronic customizing machine which can interact with a magnetically or optically cooperative computer-based input device enabling the computer to be customized as a special purpose computer, according to the contents of the software.

While the invention has been described and illustrated in connection with preferred embodiments, many variations and modifications, as will be evident to those skilled in the relevant arts, may be made without departing from the spirit and scope of the invention, and the invention is thus not to be limited to the precise details of methodology or construction set forth above as such variations and modification are intended to be included within the scope of the invention.

What is claimed is:

1. A method for electronic trading of interests over at least one network by a system including at least one computer, the method comprising:

the at least one computer receiving over the at least one network an order for an interest comprising terms for a trade of a total desired quantity of the interest, the terms comprising an identification of the interest, an initial price, an initial quantity, and a reserve quantity, the total desired quantity being equal to a sum of the initial quantity and the reserve quantity;

based on the received order, the at least one computer providing for disclosure to potential counterparties over the at least one network terms for a first proposed trade of the interest, the terms for the first proposed trade comprising an identification of the interest, the initial price, and the initial quantity;

the at least one computer, after acceptance of the first proposed trade for all or part of the initial quantity, providing for disclosure to potential counterparties over the at least one network terms of a second proposed trade of the interest, the terms for the second proposed trade comprising an identification of the interest, a second price, and a second quantity, the second price being equal to the initial price changed by a reserve price change associated with the order, and the second quantity comprising at least a portion of the reserve quantity; and prior to the acceptance of the first proposed trade, the at least one computer not providing for disclosure to potential counterparties over the at least one network of any portion of the reserve quantity.

2. The method of claim 1, wherein the interest comprises a commodities contract.

3. The method of claim 2, wherein the contract comprises an energy forward contract.

4. The method of claim 1, wherein the interest comprises an interest in an equity security.

5. The method of claim 1, wherein the interest comprises an interest in a fixed income security.

6. The method of claim 1, wherein the interest comprises currency.

7. The method of claim 1, wherein the interest comprises an interest in a first currency and the initial price and the second price are expressed in a second currency.

8. The method of claim 1, wherein all terms of the second proposed trade are automatically provided for disclosure to potential counterparties over the at least one network by the at least one computer after acceptance of the first proposed trade.

9. The method of claim 1, wherein all terms of the second proposed trade are provided for disclosure to potential counterparties over the at least one network by the at least one computer after acceptance of the first proposed trade and receipt by the at least one computer over the at least one network of a given signal.

10. The method of claim 1, wherein the proposed trades are proposed sales, and the reserve price change increases the initial price.

11. The method of claim 1, wherein the proposed trades are proposed purchases, and the reserve price change decreases the initial price.

12. The method of claim 1, wherein the second quantity is equal to a preselected quantity, or if the reserve quantity is less than the preselected quantity, all of the reserve quantity.

13. The method of claim 1, further comprising:
after acceptance of the second proposed trade, the at least one computer providing for disclosure to potential counterparties over the at least one network terms of a third proposed trade of the interest the terms for the third proposed trade comprising an identification of the interest, a third price, and a third quantity, the third price being equal to the second price changed by the reserve price change, and the third quantity being not greater than the reserve quantity less the second quantity.

14. The method of claim 13, wherein the third quantity is equal to a preselected quantity, or if the quantity of reserve remaining is less than the first and second quantities, all remaining reserve quantity.

15. The method of claim 1, further comprising completing at least one of the trades.

16. In a method for electronic trading of interests over at least one network by a system including at least one computer, wherein an order for an interest includes a total quantity, a reserve quantity and an initial price, and wherein the order is provided for disclosure over the network by the at least one computer with a quantity of the total quantity less the reserve quantity and with the initial price, the improvement comprising the at least one computer automatically providing for disclosure over the at least one network terms of a subsequent order for all or part of the total quantity from the reserve quantity after the occurrence of a given condition, the terms for the subsequent order to be provided for disclosure after the occurrence of the given condition comprising a subsequent price and a subsequent quantity, the subsequent price being equal to the initial disclosed price changed by a reserve price change associated with the order, and the subsequent quantity comprising at least a portion of the reserve quantity.

17. The method of claim 16, wherein the condition comprises acceptance of a portion of the order for which the quantity and price have been disclosed.

18. A computer program product comprising a computer readable medium having stored thereon computer code which when executed by at least one computer causes the at least one computer to perform a method for trading interests over at least one network, the method comprising:
the at least one computer receiving over the at least one network an order for an interest comprising terms for a trade of a total desired quantity of the interest, the terms comprising an identification of the interest, an initial price, an initial quantity, and a reserve quantity, the total desired quantity being equal to a sum of the initial quantity and the reserve quantity;
based on the received order, the at least one computer providing for disclosure to potential counterparties over the at least one network terms for a first proposed trade of the interest the terms for the first proposed trade comprising an identification of the interest, the initial price, and the initial quantity;
the at least one computer, after acceptance of the first proposed trade for all or part of the initial quantity, providing for disclosure to potential counterparties over the at least one network terms of the second proposed trade of the interest, the terms for the second proposed trade comprising an identification of the interest, a second price, and a second quantity, the second price being equal to the initial price changed by a reserve price change associated with the order, and the second quantity comprising at least a portion of the reserve quantity; and
prior to the acceptance of the first proposed trade, the at least one computer not providing for disclosure to potential counterparties over the at least one network of any portion of the reserve quantity.

19. The product of claim 18, wherein the interest comprises a commodities contract.

20. The product of claim 19, wherein the contract comprises an energy forward contract.

21. The product of claim 18, wherein the interest comprises an interest in an equity security.

22. The product of claim 18, wherein the interest comprises an interest in a fixed income security.

23. The product of claim 18, wherein all terms of the second proposed trade are automatically provided for disclosure to potential counterparties over the at least one network by the at least one computer after acceptance of the first proposed trade.

24. The product of claim 18, wherein all terms of the second proposed trade are provided for disclosure to potential counterparties over the at least one network by the at least one computer after acceptance of the first proposed trade and receipt by the at least one computer over the at least one network of a given signal.

25. The product of claim 18, wherein the proposed trades are proposed sales, and the reserve price change increases the initial price.

26. The product of claim 18, wherein the proposed trades are proposed purchases, and the reserve price change decreases the initial price.

27. The product of claim 18, wherein the second quantity is equal to a preselected quantity, or if the reserve quantity is less than the preselected quantity, all of the reserve quantity.

28. The product of claim 18, further comprising:
after acceptance of the second proposed trade, the at least one computer providing for disclosure to potential counterparties over the at least one network terms of a third proposed trade of the interest the terms for the third proposed trade comprising an identification of the interest, a third price, and a third quantity, the third price being equal to the second price changed by the reserve price change, and the third quantity being not greater than the reserve quantity less the second quantity.

29. The product of claim 28, wherein the third quantity is equal to a preselected quantity, or if the quantity of reserve remaining is less than the first and second quantities, all remaining reserve quantity.

30. The product of claim 18, further comprising completing at least one of the trades.

31. The product of claim 18, wherein the interest comprises currency.

32. The product of claim 18, wherein the interest comprises an interest in a first currency and the initial price and the second price are expressed in a second currency.

33. A data processing system for trading interests over at least one network, the system comprising at least one computer and a computer program product comprising a computer readable medium having stored thereon computer code which when executed by the at least one computer causes the at least one computer to at least:

receive over the at least one network an order for an interest comprising terms for a trade of a total desired quantity of the interest, the terms comprising an identification of the interest, an initial price, an initial quantity, and a reserve quantity, the total desired quantity being equal to a sum of the initial quantity and the reserve quantity;

based on the received order, provide for disclosure to potential counterparties over the at least one network terms of a first proposed trade of the interest, the terms for the first proposed trade comprising an identification of the interest, the initial price, and the initial quantity;

after acceptance of the first proposed trade for all or part of the initial quantity, provide for disclosure to potential counterparties over the at least one network, terms of a second proposed trade of the interest the terms for a second proposed trade comprising an identification of the interest, a second price, and a second quantity, the second price being equal to the initial price changed by a reserve price change associated with the order, and the second quantity comprising at least a portion of the reserve quantity; and prior to the acceptance of the first proposed trade, not providing for disclosure to potential counterparties over the at least one network of any portion of the reserve quantity.

34. The system of claim 33, wherein the at least one computer is caused to automatically provide for disclosure to potential counterparties over the at least one network all terms of the second proposed trade.

35. The system of claim 33, wherein the at least one computer is caused to provide for disclosure to potential counterparties over the at least one network all terms of the second proposed trade after acceptance of the first proposed trade and receipt by the at least one computer over the at least one network of a given signal.

36. The system of claim 33, wherein after acceptance of the second proposed trade, the at least one computer is caused to provide for disclosure to potential counterparties over the at least one network terms of a third proposed trade of the interest, the terms for the third proposed trade comprising an identification of the interest, a third price, and a third quantity, the third price being equal to the second price changed by the reserve price change, and the third quantity being not greater than the reserve quantity less the second quantity.

37. The system of claim 36, wherein the third quantity is equal to a preselected quantity, or if the quantity of reserve remaining is less than the first and second quantities, all remaining reserve quantity.

38. A method for electronic trading of interests over at least one network by a system including at least one computer, the method comprising:

the at least one computer providing for disclosure to potential counterparties over the at least one network a first quantity of an order of an interest at a first price, the order including a reserve quantity not provided by the at least one computer for disclosure to potential counterparties over the at least one network at least initially;

the at least one computer accepting a trade for the disclosed first quantity of the interest;

after accepting the trade, the at least one computer automatically providing for disclosure to potential counterparties over the at least one network of a quantity from the reserve quantity of the order for the interest at a price changed from the price of the quantity previously disclosed over the at least one network by a price change associated with the order.

39. The method of claim 38, comprising the at least one computer automatically providing for disclosure to potential counterparties over the at least one network the quantity from reserve and the price therefor.

* * * * *